(12) United States Patent
Honda

(10) Patent No.: US 6,392,873 B1
(45) Date of Patent: May 21, 2002

(54) DATA-PROCESSING APPARATUS HAVING A STAND SUPPORTING A LIQUID-CRYSTAL DISPLAY UNIT

(75) Inventor: Masami Honda, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/539,417

(22) Filed: Mar. 30, 2000

(30) Foreign Application Priority Data

Jun. 16, 1999 (JP) .......................................... 11-169750
Jun. 21, 1999 (JP) .......................................... 11-174143
Jun. 21, 1999 (JP) .......................................... 11-174144

(51) Int. Cl.[7] .............................. G06F 1/16; H05K 5/03
(52) U.S. Cl. ...................................... 361/681; 248/419
(58) Field of Search ................................ 361/681, 682, 361/683; 248/917–924; 312/223.2; D14/107, 331

(56) References Cited

U.S. PATENT DOCUMENTS

| | | | |
|---|---|---|---|
| 5,157,585 A | * 10/1992 | Myers | 361/681 |
| 5,229,757 A | * 7/1993 | Takamiya et al. | 361/681 |
| 5,247,285 A | * 9/1993 | Yokota et al. | 361/681 |
| 5,255,214 A | * 10/1993 | Ma | 361/681 |
| 5,668,570 A | 9/1997 | Ditzik | |
| 5,729,430 A | 3/1998 | Johnson | |
| 5,771,152 A | * 6/1998 | Crompton et al. | 361/681 |
| 6,081,420 A | * 6/2000 | Kim et al. | 361/681 |
| 6,108,195 A | * 8/2000 | Behl et al. | 361/681 |
| 6,168,124 B1 | * 1/2001 | Matsuoka et al. | 248/923 |
| 6,188,569 B1 | * 2/2001 | Minemoto et al. | 361/683 |
| 6,189,850 B1 | * 2/2001 | Liao et al. | 248/917 |
| 6,208,505 B1 | * 3/2001 | Kuchta et al. | 361/683 |

* cited by examiner

Primary Examiner—Lynn D. Feild
(74) Attorney, Agent, or Firm—Finnegan, Henderson, Farabow, Garrett, & Dunner, L.L.P.

(57) ABSTRACT

A data-processing apparatus including a main body. The main body includes a base and a stand extending upwards from the base. The base is shaped like a box having a prescribed width and a prescribed depth. The base contains functional components such as a hard disk drive and a CD-ROM drive. The stand is shaped like a box having a width similar to that of the base. The stand contains a circuit module. A flat liquid-crystal display unit is supported at the top of the stand. The display unit is formed integral with the main body.

6 Claims, 20 Drawing Sheets

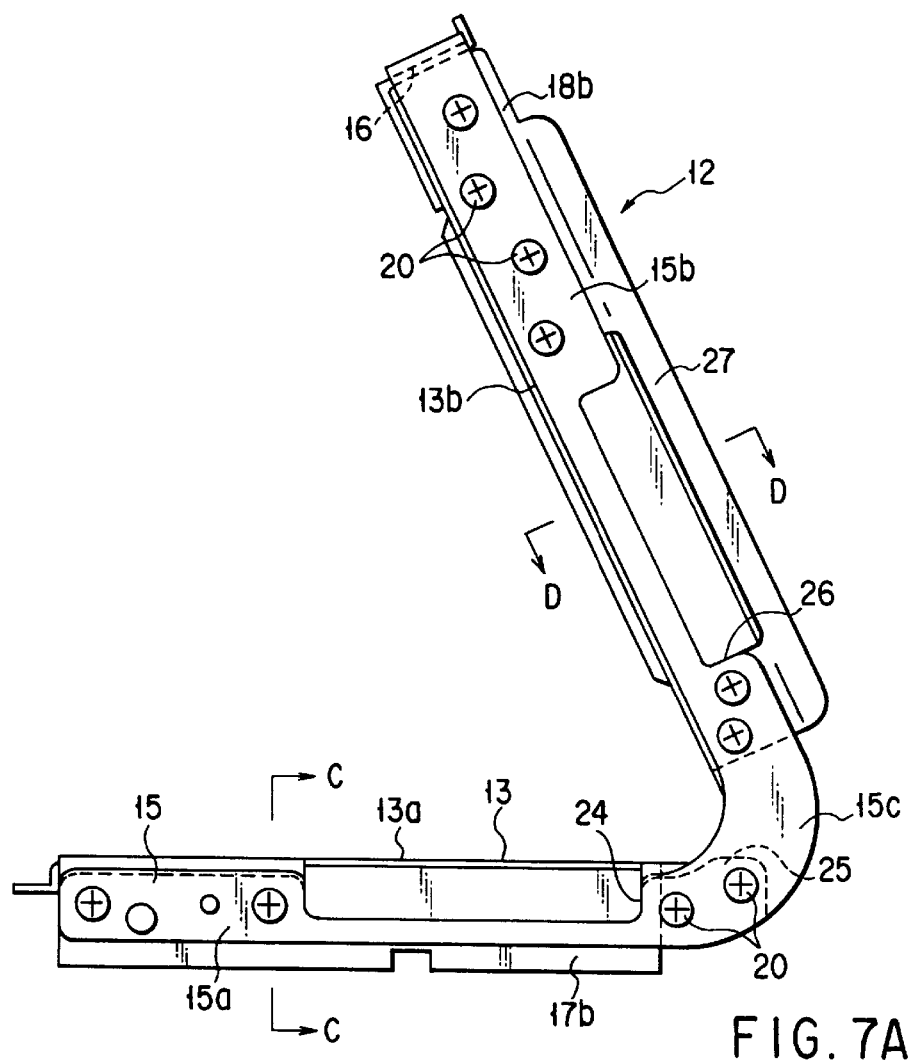
FIG. 7A
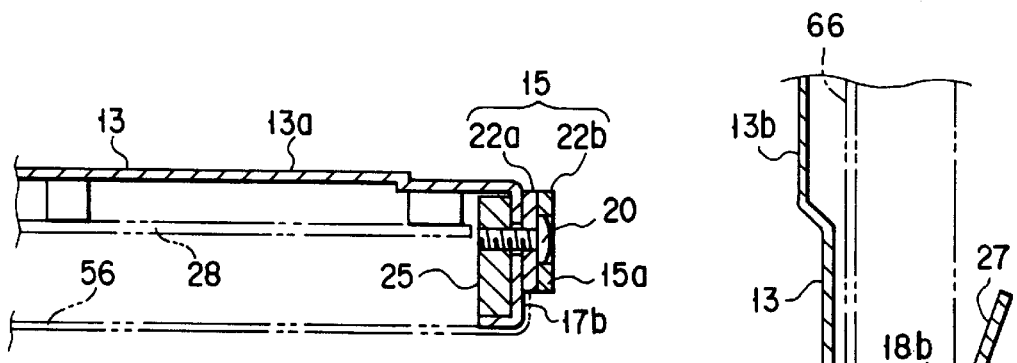
FIG. 7B
FIG. 7C

DATA-PROCESSING APPARATUS HAVING A STAND SUPPORTING A LIQUID-CRYSTAL DISPLAY UNIT

CROSS-REFERENCE TO RELATED APPLICATIONS

This application is based upon and claims the benefit of priority from the prior Japanese Patent Applications No. 11-169750, filed Jun. 16, 1999; and No. 11-174143, filed Jun. 21, 1999; and No. 11-174144, filed Jun. 21, 1999, the entire contents of which are incorporated herein by reference.

BACKGROUND OF THE INVENTION

The present invention relates to a data-processing apparatus such as a desktop computer that comprises a main body and a flat liquid-crystal display unit, which are formed integral with each other.

In recent years, so-called composite desktop computers are available in various types. Composite desktop computers comprise a main body and a flat liquid-crystal display unit each, which are formed integral. A composite desktop computer requires only half the installation space of the tower-type computer with a CRT display or less than half that installation space. Thus, the composite desktop computers are advantageous in respect of space saving.

The main body of the conventional desktop computer has a box-shaped housing, which is mounted on, for example, the top of a desk. The housing supports a liquid-crystal display unit. The housing contains major components of the computer, such as the circuit board with a CPU mounted on it, the hard disk drive and the CD-ROM drive.

The major components must be packed within one chamber provided in the housing, along with many other components connected to them. That is, a great number of components are mounted within the chamber, at high density in a complicated layout pattern. It is quite a task for computer designers to arrange the components in the chamber at as high a density as possible.

The designers find it rather easy to arrange the components in the chamber if the housing is made larger to provide a larger chamber. If the housing is made larger, however, the main body will become larger. As a consequence, the advantage of the composite desktop computer, i.e., space saving, will be diminished.

In the case of the conventional desktop computer, the liquid-crystal display unit is positioned in front of the main body. Since the display unit is a comparatively heavy component, the center of gravity of the computer lies in the front of the main body. The main body is elongated in most cases, having a small depth so that the desktop computer may occupy a small space. Therefore, the main body may topple forward when an external force is applied to the computer to push forwards the liquid-crystal display unit.

To prevent the main body from toppling, the desktop computer has legs that extend forwards from the front lower edge of the main body. The legs for preventing the toppling of the main body contact the top of the desk on which the computer is mounted. The desktop computer is stabilized on the desk.

The legs are indispensable to the conventional desktop computer. The main body is composed of more parts than otherwise. This ultimately increases the manufacturing cost of the desktop computer. Extending from the front lower edge of the main body, the legs are seen by the user of the computer who sits before the desktop computer. Inevitably, the legs jeopardize the outer appearance of the desktop computer.

Furthermore, since the main body is shaped like an elongated box because it has been designed from a functional viewpoint only. Thus, when the desktop computer is seen from the back, it cannot be said to present a good appearance. The conventional desktop computer has yet to be improved in terms of outer appearance.

BRIEF SUMMARY OF THE INVENTION

The first object of the present invention is to provide a data-processing apparatus whose main body remains sufficiently compact and can yet contain many components efficiently.

The second object of the invention is to provide a data-processing apparatus whose main body can take a stable composition, requiring no legs for preventing it from toppling, and which is stylish and has a good outer appearance.

To achieve the first object, a data-processing apparatus according to the invention comprises a main body, functional components, a circuit module, and a flat liquid-crystal display unit. The main body includes a base and a stand. The base is shaped like a box and has a prescribed width and a prescribed depth. The functional components are provided in the base. The stand is shaped like a box, extends upwards from the stand and has a width similar to the width of the base. The circuit module is provided in the stand and has a circuit board and a plurality of circuit components. The circuit components are mounted on the circuit board. The liquid-crystal display unit is supported at a top of the stand and formed integral with the main body.

To achieve the first object, too, another data-processing apparatus according to the invention comprises a main body, functional components, a circuit module, a cooling unit, and a flat liquid-crystal display unit. The main body includes a base and a stand. The base is shaped like a box and has a prescribed width and a prescribed depth. The stand is shaped like a box, extends upwards from the stand and has a width similar to the width of the base. The functional components are provided in the base. The circuit module is provided in the stand and has a circuit board and a heat-generating component mounted on the circuit board. The cooling unit is provided in the stand, for cooling the heat-generating component. The liquid-crystal display unit is supported at a top of the stand and formed integral with the main body.

With the data-processing apparatuses, a space extending in the widthwise direction of the main body is provided in the stand supporting the liquid-crystal display unit. The space can accommodate the circuit module and the cooling unit. Some components such as a CD-ROM drive and a floppy disk drive can be provided in the base. Hence, the circuit module and the functional components can be laid out in three-dimensional fashion, in accordance with the shape of the main body, without increasing the surface area or thickness of the base. The main body can therefore be compact as is desired.

To attain the second object described above, still another data-processing apparatus according to the invention comprises a main body and a flat liquid-crystal display unit. The main body includes a base to be placed on a horizontal surface and a stand extending upwards from a rear end of the base. The stand inclines toward a front of the base as the stand extends upwards. The liquid-crystal display unit is supported at a top of the stand and located in front of the stand. The display unit is formed integral with the main body.

Since the stand inclines toward the front of the base as it extends upward from the base, the liquid-crystal display unit, which is heavy, is located between the front and rear edges of the base. The main body including the display unit therefore has its gravity center above the base. Thus, the main body can assume a stable position on the horizontal surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7A is a right-side view of the frame;

FIG. 7B is a sectional view taken along line C—C in FIG. 7A;

FIG. 7C is a sectional view taken along line D—D in FIG. 7A;

DETAILED DESCRIPTION OF THE INVENTION

An embodiment of the present invention, which is a desktop computer, will be described with reference to the accompanying drawings.

Figure 1:
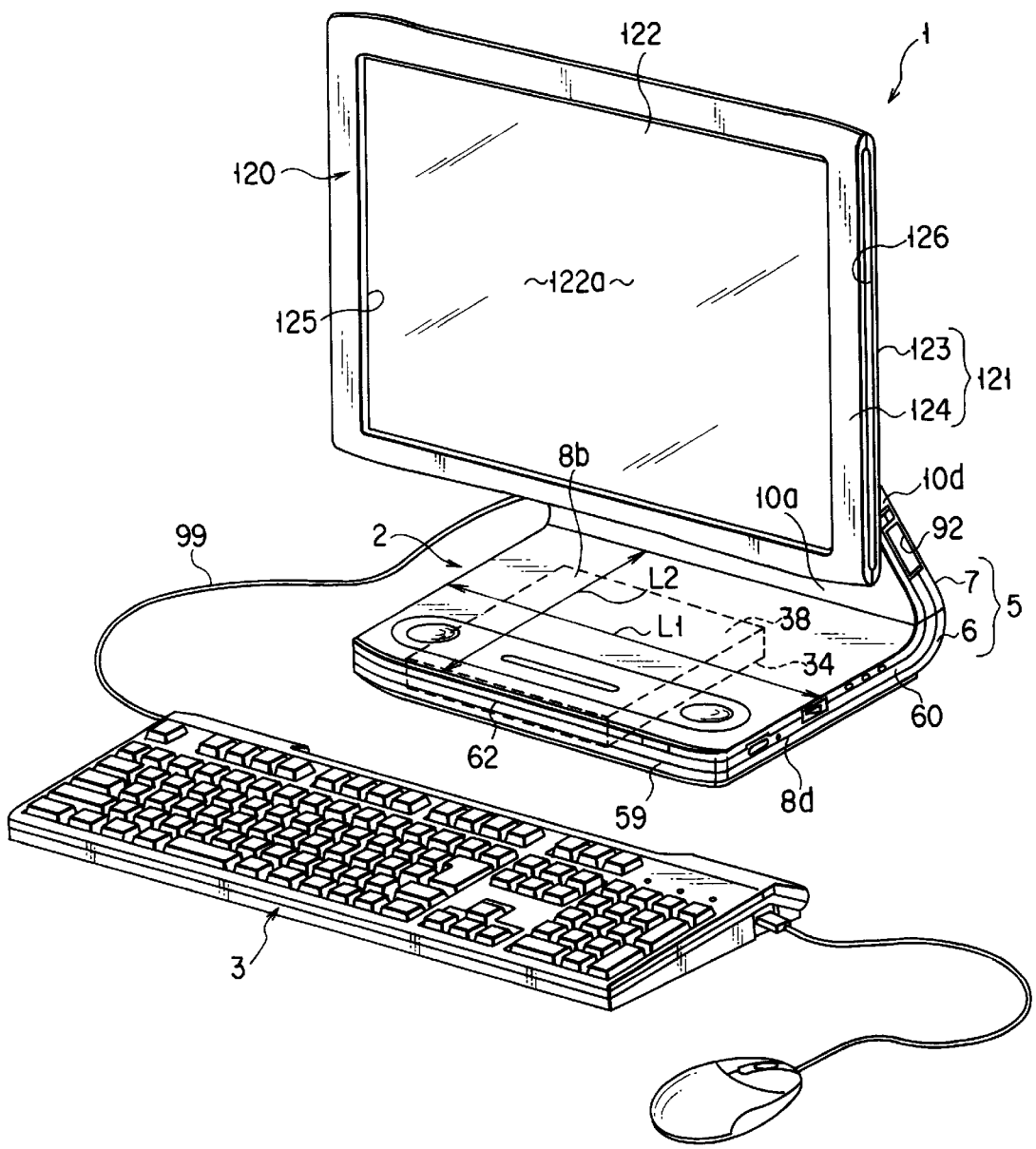
FIG. 1 is a perspective view of a desktop computer according to the first embodiment of this invention.

FIG. 1 shows the desktop computer 1, which is a data-processing apparatus according to the present invention. The computer 1 comprises a main body 2 and a keyboard 3. The keyboard 3 is connected to the main body 2. Both the main body 2 and the keyboard 3 are placed on a horizontal surface 4 (shown in FIG. 3) such as the top of a desk.

Figure 2:
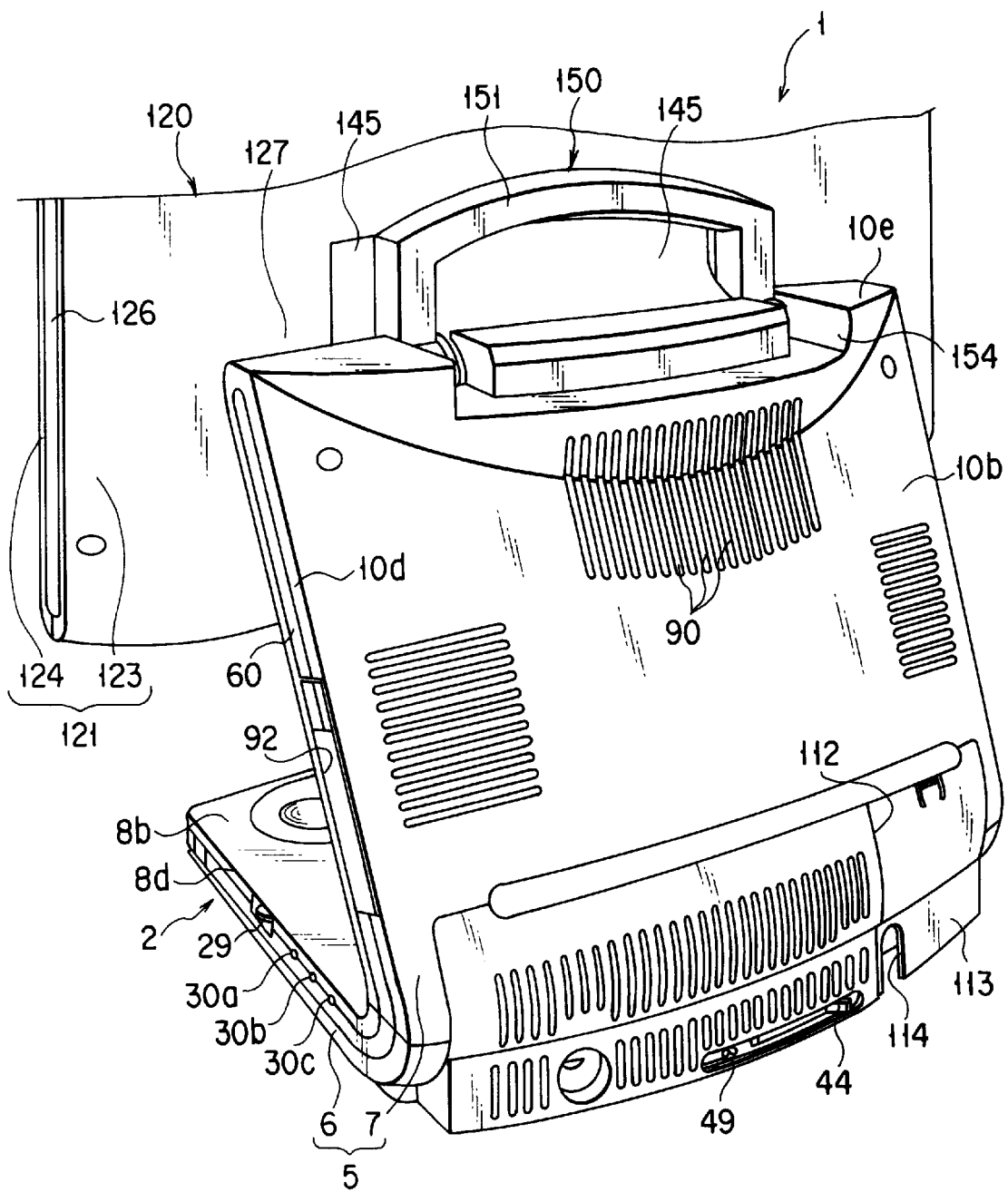
FIG. 2 is a perspective view of the desktop computer, as seen from the back.

As shown in FIGS. 1 and 2, the main body 2 has a housing 5, which is made of synthetic resin. The housing 5 is composed of a base 6 and a stand 7. The base 6 is shaped like a flat rectangular box of, for example, B5 size, having a width L1 and a depth L2. The base 6 has a bottom wall 8a, top wall 8b, left-side wall 8c, right-side wall 8d and front wall 8e.

The stand 7 extends upwards from the rear end of the top wall 8b of the base 6. The stand 7 is shaped like a box, having a front wall 10a, a rear wall 10b, left-side wall 10c, right-side wall 10d and top wall 10e. The stand 7 has same width L1 as the base 6. It inclines toward the front of the base 6 at an angle α as it extends upwards. The angle α of inclination is preferably about 65°. The top of the stand 7 is located above the midpoint between the front and rear edges of the base 6.

Figure 17:
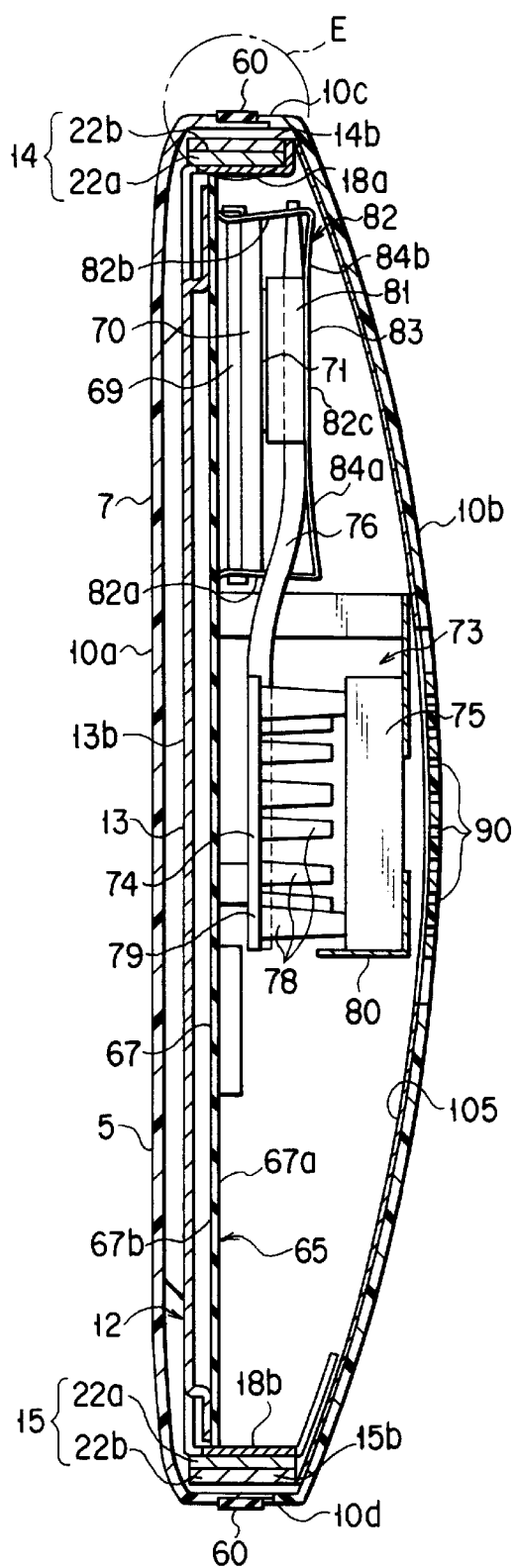
FIG. 17 is a sectional view of the stand, illustrating the positional relation between the semiconductor package and the cooling unit, both mounted on the circuit board incorporated in the main body.

The front wall 10a of the stand 7 is a flat plate. The lower edge of the front wall 10a is connected to the rear edge of the top wall 8b of the base 6. As is best shown in FIG. 17, the rear wall 10b of the stand 7 is curved in the form of an arc, bulging from the rear of the main body 2. Thus, its middle part is more remote from the front wall 10a than any other part. Hence, the stand 7 has the greatest thickness at its middle part.

The side walls 8c and 8d of the base 6 are connected to the side walls 10c and 10d of the stand 7, respectively. These walls 8c, 8d, 10c and 10d constitute the two sides of the main body 2. The two sides of the main body 2 are L-shaped as seen from FIGS. 2 and 20. The L-shape of the housing 5 is one of the design features of the desktop computer 1.

Figure 3:
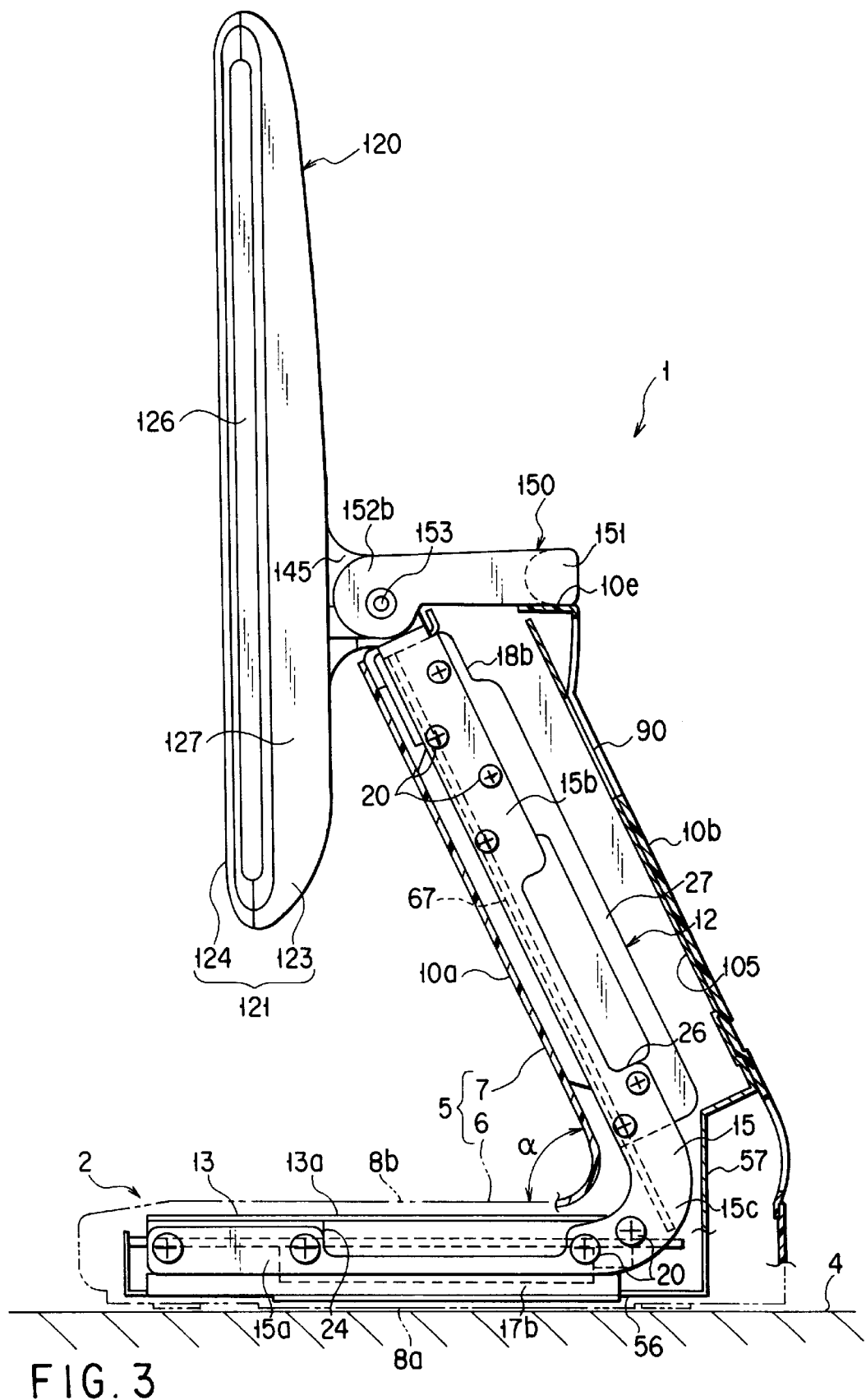
FIG. 3 is a side view of the desktop computer, showing a cross section of the main body of the computer.
Figure 4:
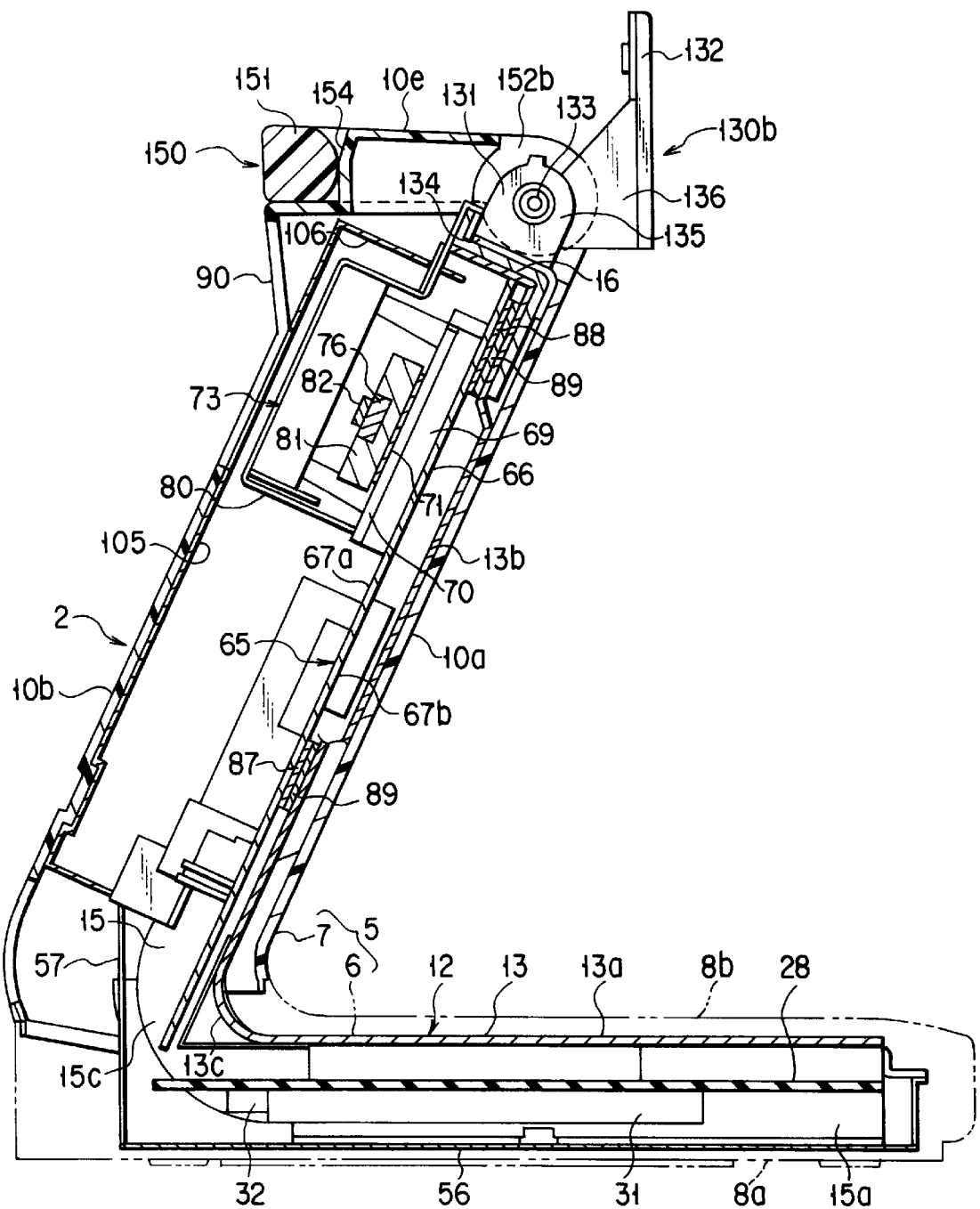
FIG. 4 is a sectional view of the main body of the desktop computer.
Figure 5:
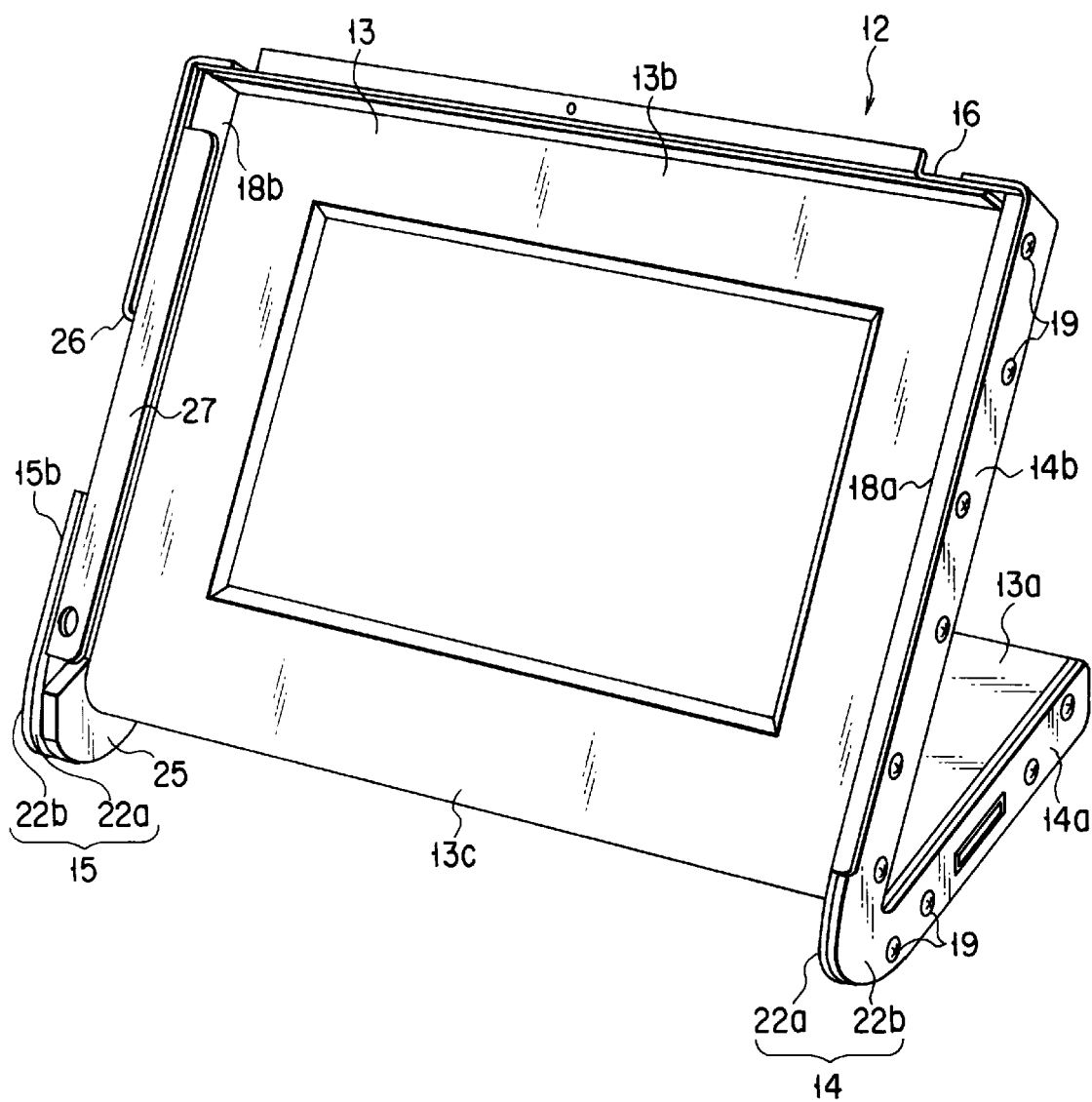
FIG. 5 is a perspective view of the frame that is the basic member of the main body.

As shown in FIGS. 3 and 4, the housing 5 contains a frame 12 that is made of metal. The frame 12 is, as it were, the backbone of the main body 2. As is best shown in FIG. 5, the frame 12 comprises a frame body 13, a pair of reinforcing plates 14 and 15, and a display-supporting plate 16.

The frame body 13 is a steel plate that has a thickness of, for example, about 1.5 mm. The body 13 is bent in the form of letter L, thus extending along the sides of the housing 5. The body 13 has a base-frame section 13a and a stand-frame section 13b. The base-frame section 13a horizontally extends along the top wall 8b of the base 6. The stand-frame section 13b upwardly extends along the front wall 10a of the stand 7. The base-frame section 13a and the stand-frame section 13b are coupled together by a coupling section 13c that is bend in the form of an arc.

The left and right sides of the base-frame section 13a face the inner surfaces of the side walls 8c and 8d of the base 6. As shown in FIGS. 6B and 7B, bracket sections 17a and 17b, both bent downwards, are formed integral with the left and right sides of the base-frame section 13a. The bracket sections 17a and 17b oppose the side walls 8c and 8d of the base 6, respectively.

The left and right sides of the stand-frame section 13b face the inner surfaces of the side walls 10c and 10d of the stand 7. As shown in FIGS. 6C and 7C, bracket sections 18a and 18b, both bent backwards, are formed integral with the left and right sides of the stand-frame section 13b. The bracket sections 18a and 18b oppose the side walls 10c and 10d of the stand 7, respectively.

The bracket section 17a of the base-frame section 13a and the bracket section 18a of the stand-frame section 13b are spaced part. Similarly, the bracket section 17b of the base-frame section 13a and the bracket section 18b of the stand-frame section 13b are spaced part. Thus, the frame body 13 can be bent with ease.

The reinforcing plates 14 and 15 reinforce the frame body 13 to maintain the base-frame section 13a and the stand-frame section 13b in a predetermined positional relation. The plates 14 and 15 are stainless steel plates, harder than steel plates. The plates 14 and 15 have been L-shaped by thin-plate working, more precisely press working, and extend along the sides of the main body 2. The plates 14 and 15 are much thicker than the frame body 13.

Figure 6A:
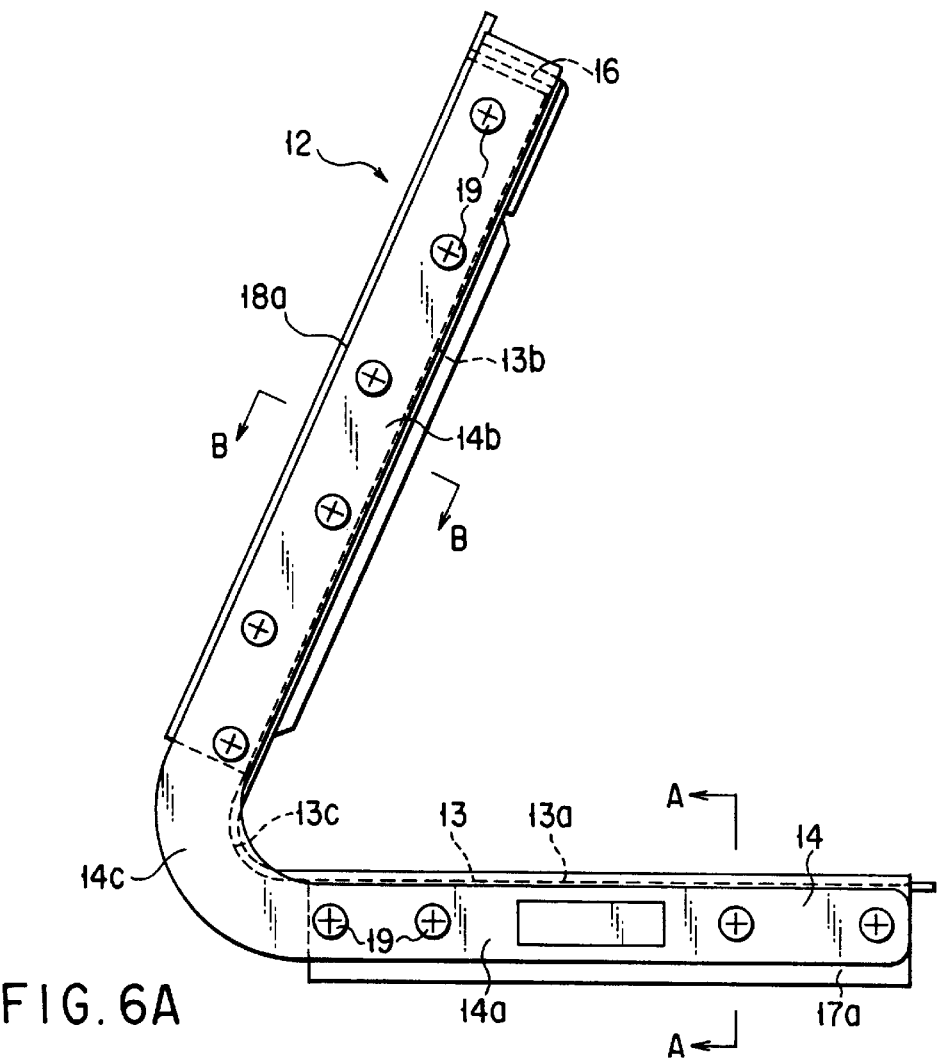
FIG. 6A is a left-side view of the frame.
Figure 6B:
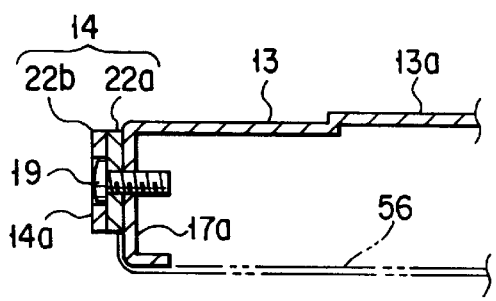
FIG. 6B is a sectional view taken along line A—A in FIG. 6A.
Figure 6C:
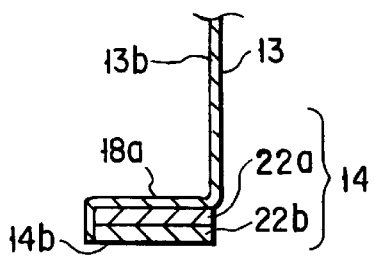
FIG. 6C is a sectional view taken along line B—B in FIG. 6A.

As illustrated in FIG. 6A, the left-side reinforcing plate 14 has three parts 14a, 14b and 14c that are formed integral. The first part 14a is laid on the outer surface of the bracket section 17a of the base-frame section 13a. The second part 14b is laid on the outer surface of the bracket section 18a of the stand-frame section 13b. The third part 14c is coupled with the first and second parts 14a and 14b. The first and second parts 14a and 14b are fastened by screws 19 to the bracket sections 17a and 18a, respectively. The third part 14c is thereby positioned by the left side of the coupling section 13c of the frame body 13.

As FIG. 7A shows, the right-side reinforcing plate 15 has three parts 15a, 15b and 15c that are formed integral. The first part 15a is laid on the outer surface of the bracket section 17b of the base-frame section 13a. The second part 15b is laid on the outer surface of the bracket section 18b of the stand-frame section 13b. The third part 15c is coupled with the first and second parts 15a and 15b. The first and second parts 15a and 15b are fastened by screws 20 to the bracket sections 17b and 18b, respectively. The third part 15c is thereby positioned on the right side of the coupling section 13c of the frame body 13.

The left reinforcing plate 14 and the right reinforcing plate 15 have an elongated cross section which extends at almost right angles to the base-frame section 13a and the stand-frame section 13b. Therefore, the third part 14c of the plate 14 and the third part 15c of the plate 15 bear a load which may be applied to the stand-frame section 13b to press the same toward the base-frame section 13a.

The reinforcing plates 14 and 15 have been made, each by overlapping two pressed parts 22a and 22b and spot-welding them together. Why two each reinforcing plate is composed of two parts 22a and 22 will be explained. Both reinforcing plates 14 and 15 must be a stainless steel plate having a thickness of at least about 5 mm. To press such a thick stainless steel plate to provide a reinforcing plate, a large press that can exert a high pressure. Use of such a massive press will increase the manufacturing cost of the reinforcing plates 14 and 15.

A massive press need not be employed to form the reinforcing plates 14 and 15, because each reinforcing plate is composed of two pressed parts 22a and 22b. The parts 22a and 22b need to be only 2.5 mm thick. Thus, to press and shape the parts 22a and 22b, it suffices to used a small press that exerts half the pressure the large press does. The reinforcing plates 14 and 15 can, therefore, be made at a relatively low cost.

As shown in FIG. 7A, the first part 22a of the right-side reinforcing plate 15 has an elongated through hole 24. The bracket section 17b of the base-frame section 13a that overlaps the reinforcing plate 15 has an elongated through hole 24. These holes 24 reduce the height of the first part 15a of the plate 15 and the height of the bracket section 17b. To compensate for the reduction in the height of the first part 22a and bracket section 17b, a backing plate 25 made of metal is laid on the inner surface of the bracket section 17b as illustrated in FIG. 7B. The backing plate 25 is fastened to the bracket section 17b by means of the above-mentioned screws 20.

As shown in FIG. 7A, too, the second part 15b of the right-side reinforcing plate 15 has a notch 26, and the bracket section 18b of the stand-frame section 13b has a notch 26. Both notches 26 extend in the direction the stand 7 extends slantwise. The notches 26 open at the upper edge of the second part 15b of the reinforcing plate 15, thus reducing the height of the second part 15b. To make up for the reduction in the height of the second part 15b, a flange section 27 is formed integral with the upper edge of the bracket section 18b. The flange section 27 is a flat plate, which extends in the lengthwise direction of the bracket section 18b. The flange section 27 extends inwardly from the upper edge of the bracket section 18b and opposes the stand-frame section 13b.

The display-supporting plate 16 is a stainless steel plate having a thickness of, for example, about 2.0 mm. The display-supporting plate 16 spans between the second part 14b of the reinforcing plate 14 and the second part 15b of the reinforcing plate 15. The plate 16 fastened at ends to the parts 14b and 15b by screws. The plate 16 extends over the upper edge of the stand-frame section 13b in the widthwise direction of the stand 7.

As shown in FIGS. 4 and 7B, an input/output board 28 is provided below the base-frame section 13a. The input/ output board 28 horizontally extends along the base-frame section 13a and is positioned at the right-side part of the base 6. On the right part of the board 28 there are arranged, in a row, a volume dial 29, a headphone output terminal 30a, a microphone input terminal 30b, and an audio-data input terminal 30c. The volume dial 29 and the terminals 30a, 30b and 30c are located in the through hole 24 of the reinforcing plate 15. As shown in FIG. 2, the dial 29 and the terminals 30a to 30c are exposed to the right-side surface of the base 6. A hard disk drive 31, which is a functional component of the desktop computer 1, is mounted on the lower surface of the input-output board 28. The hard disk drive 31 is electrically connected by the first connector 32 to the input-output board 28.

As FIGS. 8 to 12 show, a tray 33 is secured to the lower surface of the base-frame section 13a. The tray 33 has a bottom plate 33a and side walls 33b and 33c. The bottom plate 33a is flat, facing the base-frame section 13a. The side walls 33b and 33c extend upwards from the side edges of the bottom plate 33a . The tray 33 cooperates with the base-frame section 13a, defining a receptacle 34 in the base 6. The receptacle 34 is located on the left side of the hard disk drive 31. The bottom wall 33a has two openings 33d, which are shaped like a slit. The openings 33d open to the receptacle 34.

The receptacle 34 communicates with an insertion port 35 (shown in FIG. 14) which is made in the front wall 8e of the base 6. A second connector 36 is arranged in the receptacle 34 and mounted on a connector board 37. The connector board 37 is supported by the rear end of the base-frame section 13a.

Into the receptacle 34, a CD-ROM drive 38 or a floppy disk drive (not shown) has been inserted through the insertion port 35 of the front wall 8e. The CD-ROM drive 38 or the floppy disk drive can be removed from the receptacle 34. The CD-ROM drive 38 has a third connector 39 on its distal end. The third connector 39 is fitted into the second connector 36 when the CD-ROM drive 38 is completely inserted into the receptacle 34. Once fitted into the second connector 36, the CD-ROM drive 38 is firmly held in the receptacle 34.

As shown in FIGS. 8 to 11, the tray 33 has an ejector-supporting section 41, which extends backwards from the read edge of the bottom wall 33a. The ejector-supporting section 41 supports an ejector 43 on its upper surface. The ejector 42 comprises an eject plate 43, an eject lever 44, and a lock lever 45. The eject lever 44 is provided to move the eject plate 43. The lock lever 45 locks the eject lever 44 when necessary.

Figure 8:
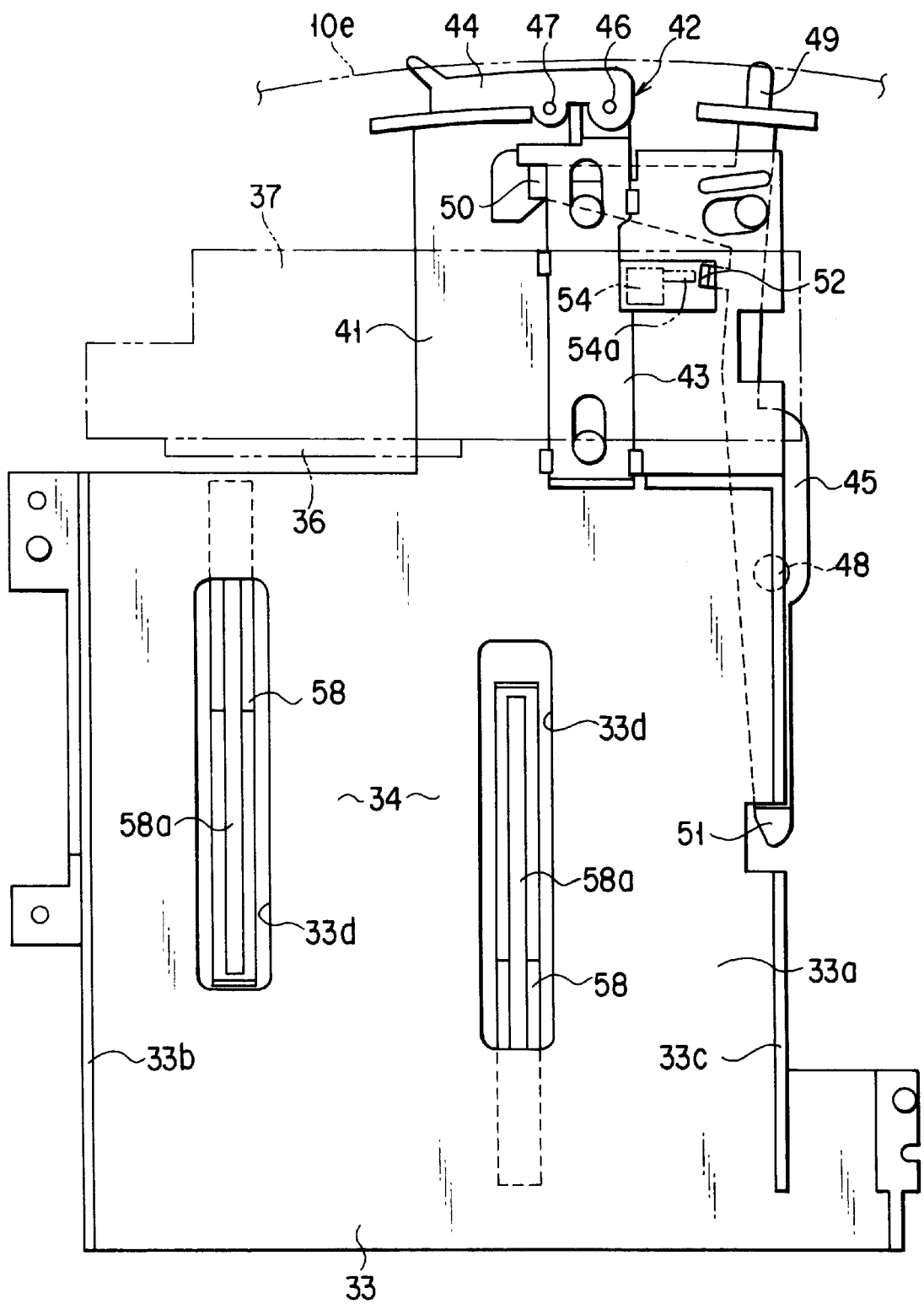
FIG. 8 is a plan view of the tray incorporated in the main body and having an ejector.
Figure 9:
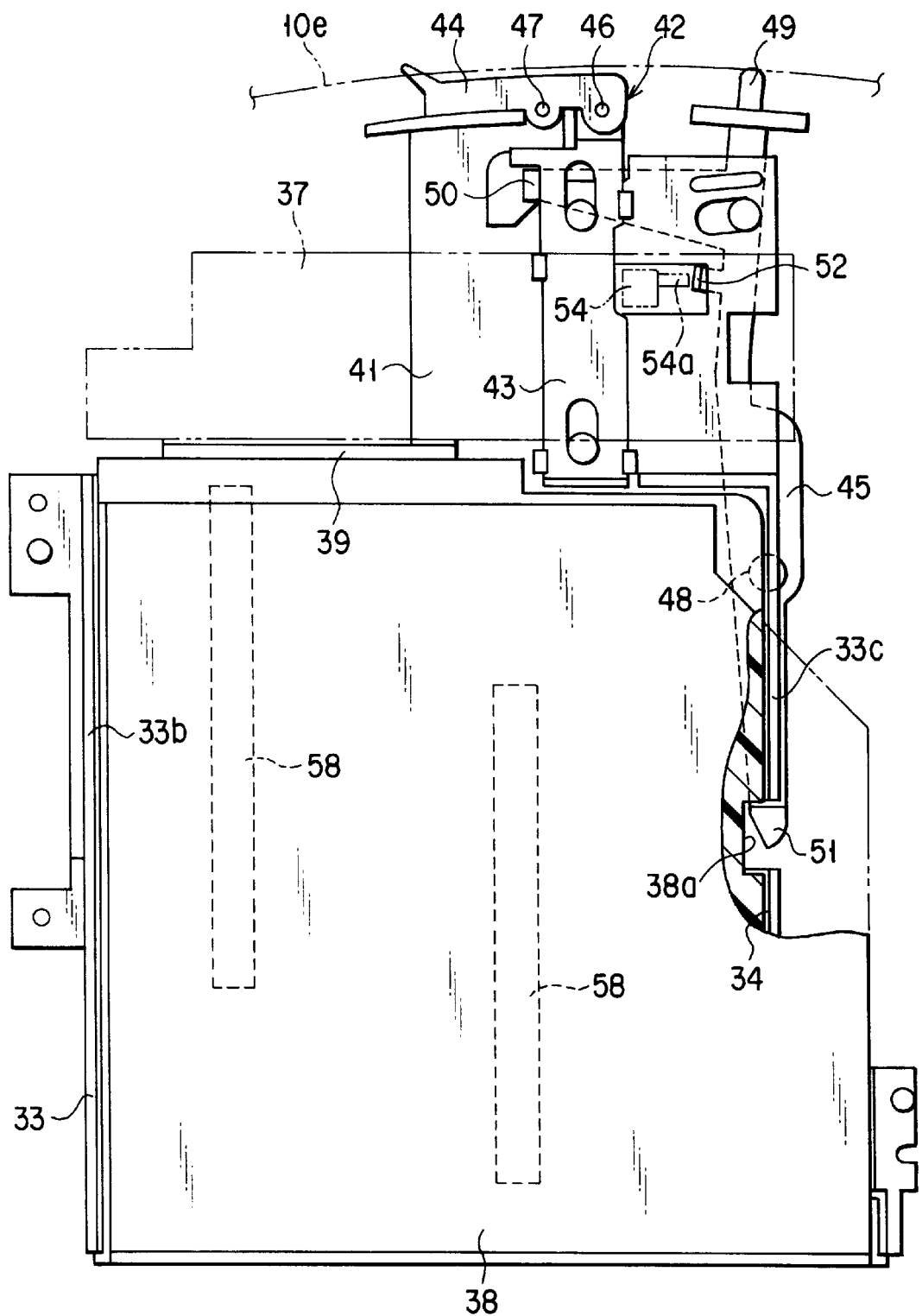
FIG. 9 is a plan view of the tray holding a CD-ROM drive.

The eject plate 43 can slide back and forth on the upper surface of the eject-supporting section 41, between the first position (FIG. 10) and the second position (FIGS. 8 and 9). At the first position, the eject plate 43 projects from the end of the receptacle 34 toward the insertion port 35. At the second position, the eject plate 43 rests on the upper surface of the ejector-supporting section 41. The eject lever 44 is coupled with the rear end of the eject plate 43 by a first pin 46. Further, the eject lever 44 is coupled, at a part near the first pin 46, to the rear end of the ejector-supporting section 41 by a second pin 47.

Figure 10:
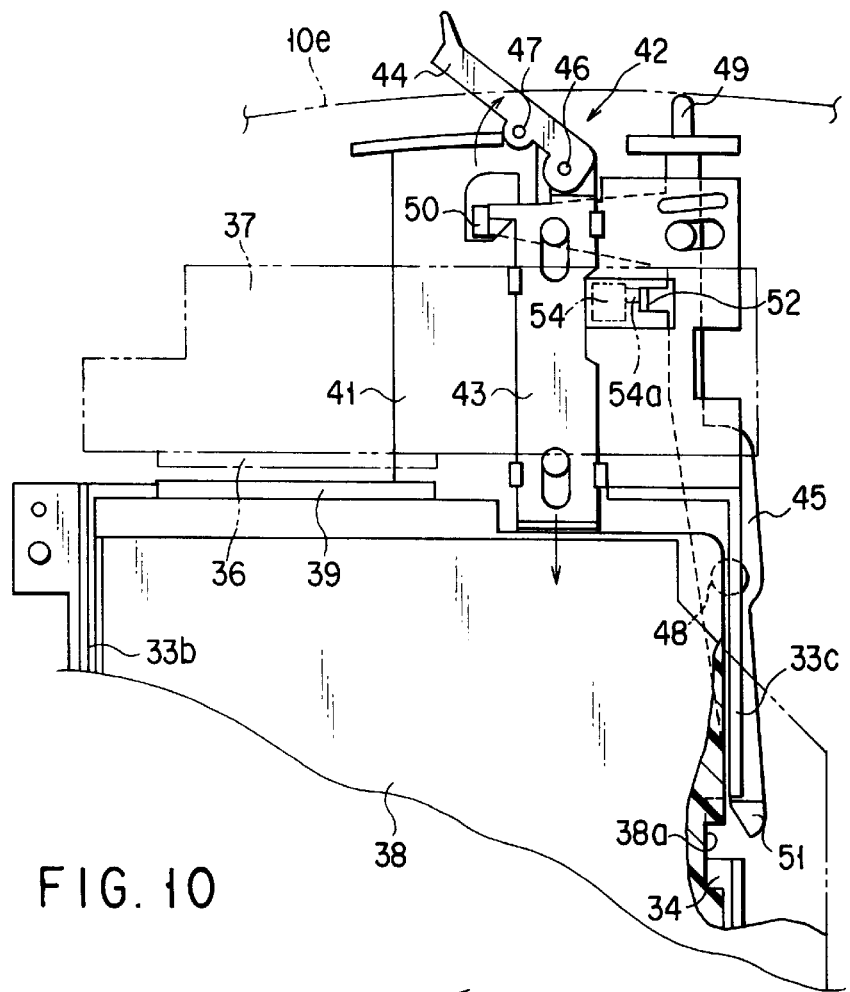
FIG. 10 is a plan view of the tray, showing the CD-ROM drive ejected from the main body by operating the ejector.

The eject lever 44 can rotate around the second pin 47, from an eject position and an ejection-releasing position. When the eject lever 44 is rotated backwards to the eject position as shown in FIG. 10, the eject plate 43 slides to the first position. In this case, the eject plate 43 pushes the CD-ROM drive 38 toward the insertion port 35, disconnecting the third connector 39 from the second connector 36. When the eject lever 44 is rotated to the ejection-releasing position as shown in FIG. 9, the eject plate 43 slides to away from the insertion port 35 to the second position. In this case, the eject plate 43 no longer push the CD-ROM drive 38 toward the insertion port 35.

The lock lever 45 is positioned near the eject plate 43 and extends in the depth direction of the tray 33. The lever 45 can rotate, supported at its middle portion by a shaft 48 that protrudes downwards from the tray 33. The lever 45 has, at its rear end, a finger-rest section 49 and a first engagement section 50. The finger-rest section 49 penetrates the rear wall 10b of the stand 7 and extends outward therefrom, along with the eject bar 44. The first engagement section 50 extends from the lock lever 45 toward the eject plate 43.

Figure 11:
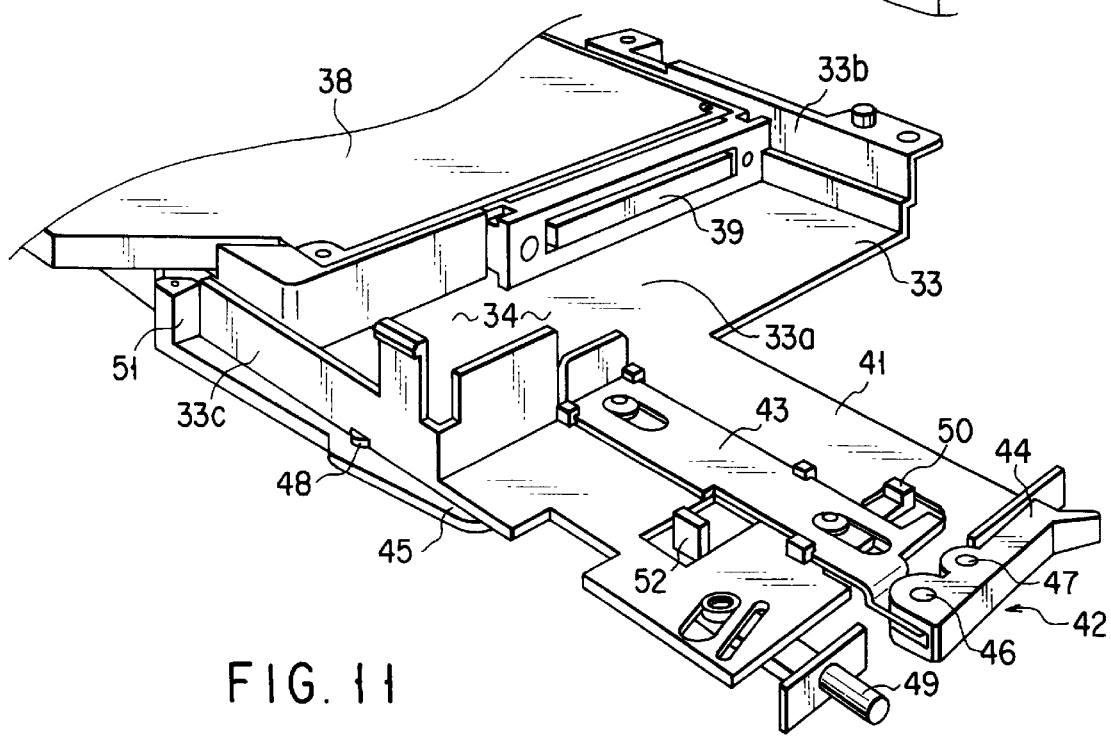
FIG. 11 is a perspective view of the tray, illustrating the positional relation between the CD-ROM drive and the ejector.

While the eject plate 43 remains at the second position, the lock lever 45 can be rotated by a user of the computer 1, between a locking position (FIGS. 8 and 9) and an unlocking position (FIGS. 10 and 11). While the lock lever 45 stays at the locking position, the first engagement section 50 hitches to the eject plate 43. While the lock lever 45 is rotated to the unlocking position, the first engagement section 50 is released from the eject plate 43.

The lock lever 45 has, at its front end, a second engagement section 51. (It should be recalled that the first engagement section 50 is provided at the rear end of the lock lever 45.) When the lock lever 45 is rotated to the locking position as shown in FIG. 9, the second engagement section 51 moves into the engagement recess 38a made in one side of the CD-ROM drive 38. The CD-ROM drive 38 is thereby locked in the receptacle 34. When the lock lever 45 is rotated to the unlocking position as shown in FIG. 10, the second engagement section 51 moves out of the engagement recess 38a, thus unlocking the CD-ROM drive 38 with respect to the receptacle 34.

As long as the lock lever 45 stays in the locking position, the first engagement section 50 remains hitched to the eject plate 43. The eject lever 44 cannot be rotated to the eject at all. The eject plate 43 is therefore held at the second position, preventing an erroneous pulling of the CD-ROM drive 38 from the base 6.

The lock lever 45 has a third engagement section 52, which is located near the first engagement section 50. The third engagement section 52 is positioned below the connector board 37. The section 52 faces a detection switch 54 that is mounted on the lower surface of the connector board 37. The detection switch 54 has an actuator 54a. The third engagement section 52 leaves the actuator 54a when the lock lever 45 is rotated to the locking position as shown in FIG. 9. As a result, the detection switch 54 closes. When the lock lever 45 is rotated to the unlocking position as shown in FIG. 10, the third engagement section 52 pushes the actuator 54a. In this case, the detection switch 54 opens.

Thus, the detection switch 54 closes to supply power to the CD-ROM drive 38 or opens to stop supplying power thereto, in accordance with the position of the lock lever 45. More specifically, the detection switch 54 opens, stopping the supply of power to the CD-ROM drive 38 if the lock lever 45 stays at the unlocking position and if the eject lever 44 can be rotated to the eject position.

Figure 12:
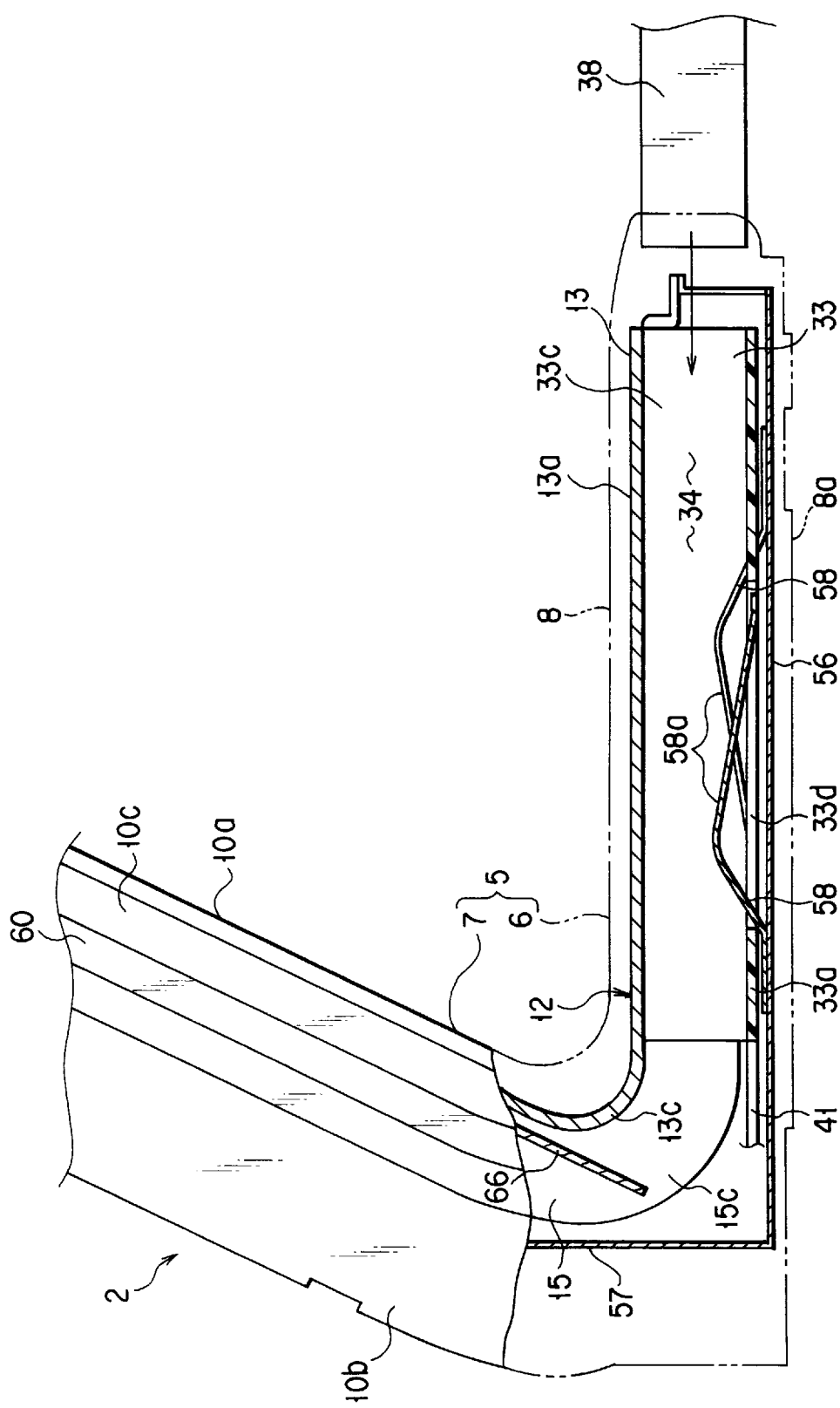
FIG. 12 is a sectional view of the main body, depicting the positional relation between the tray and a pair of contact strips secured to the first shield plate.

As FIGS. 4 and 12 show, the input/output board 28 and the tray 33 are covered, from below, by a first shield 56 made of metal. The first shield 56 is fastened by screws to the lower surface of the first part 14a of the reinforcing plate 14 and the lower surface of the first part 15a of the reinforcing plate 15. The first shield 56 is therefore made integral with the frame body 13. The first shield 56 extends along the bottom wall 8a of the base 6. At the rear edge of the first shield 56 there is provided a vertical wall 57, which protrudes up into the stand 7.

The first shield 56, the base-frame section 13a of the frame body 13, the first part 14a of the first reinforcing plate 14, and the first part 15a of the second reinforcing plate 15 surround the input-output board 28, receptacle 34 and connector board 37. The first shield 56 therefore prevents leakage of electromagnetic noise from the base 6. As shown in FIG. 12, a pair of contact strips 58 is secured to the upper surface of the first shield 56. The contact strips 58 have a spring part 58a each. Each spring part 58a is bent upwards and can undergo elastic deformation. The spring part 58a bulges into the receptacle 34 through the opening 33d of the tray 33. The spring part 58a abuts on the bottom of the CD-ROM drive 38 or floppy disk drive when the drive 38 is inserted into the receptacle 34, or when the floppy disk drive is inserted into the receptacle 34. In either case, the spring part 58a is elastically deformed and is pushed onto the bottom of the CD-ROM drive 38 or floppy disk drive with a large force. As a result of this, the contact strip 58 electrically connects the CD-ROM drive 38 or the floppy disk drive to the first shield 56. The CD-ROM drive 38 or the floppy disk drive is, therefore, connected to the ground reliably.

Figure 13:
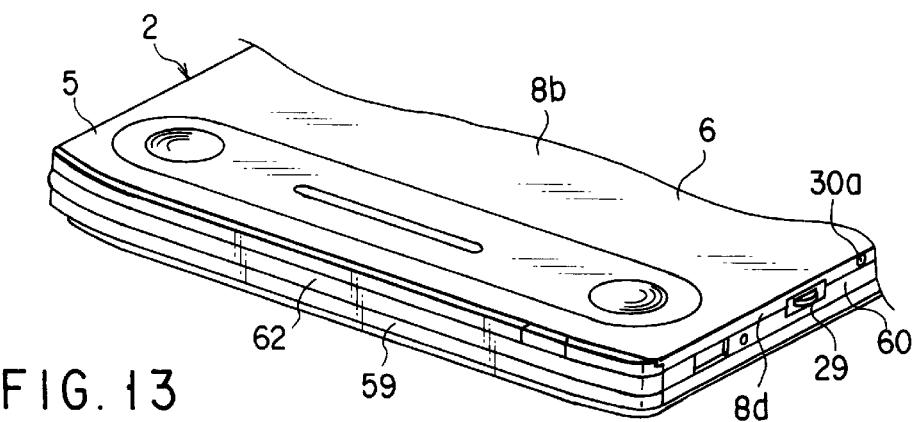
FIG. 13 is a perspective view of the main body, showing the front door of the base, which remains in the closed position.
Figure 14:
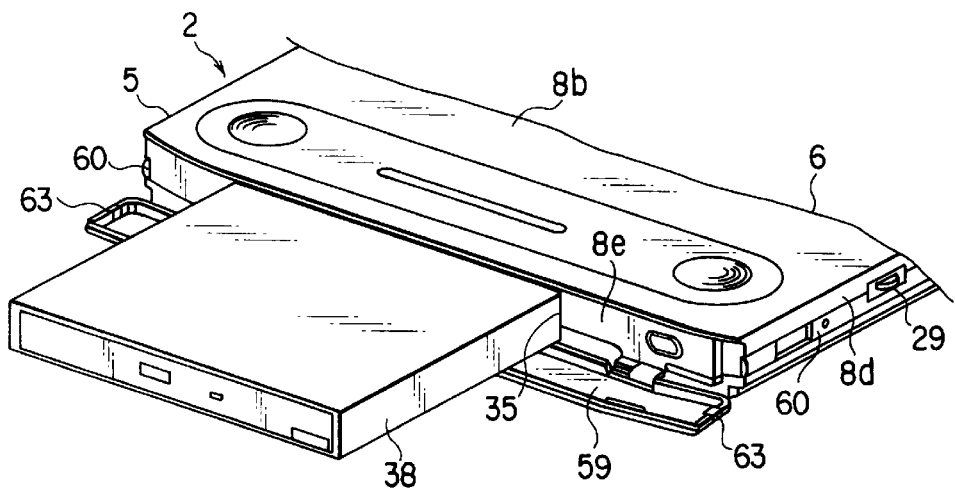
FIG. 14 is a perspective view of the main body, showing the front door in the opened position and the CD-ROM drive drawn outwards.

As shown in FIGS. 13 and 14, the front edge of the base 6 has a front door 59. The front door 59 extends horizontally over the entire width of the base 6. The left and right ends of the front door 59 are connected to the side walls 8c and 8d of the base 6. The front door 59 is supported at the front of the base 6 and can be swung between a closed position (FIG. 13) and an opened position (FIG. 14). At the closed position, the front door 59 covers the front wall 8e of the base 6 and the insertion port 35. At the opened position, the front door 59 exposes the front wall 8e of the base 6 and the insertion port 35. The front door 59 is rotated to the opened position, in order to allow the CD-ROM drive 38 or the floppy disk drive (not shown) to inserted into the receptacle 34 or pull the same out of the receptacle 34.

Figure 18:
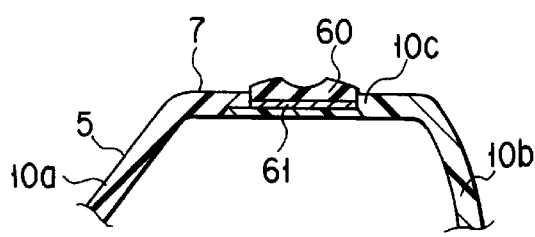
FIG. 18 is a magnified sectional view of the part E of FIG. 17.

As FIG. 2 shows, two decorative side strips 60 are respectively laid on the left and right sides of the L-shaped housing 5. As is shown in FIG. 17 and FIG. 18 that is a magnified view of part E of FIG. 17, the side strips 60 are removably bonded to the L-shaped housing 5 with double-sided adhesive tape 61. The side strips 60 are made of rubber so that the user of the computer 1 may feel them without fail. The side strips 60 differ in color from the housing 5 and extend along the left and right sides of the housing 5. Hence, the side strips 60 serve as accent color, accentuating the shape of the sides of the housing 5.

As shown in FIG. 13, a decorative front strip 62 is provided on the front door 59. The front strip 62 is made of rubber, like the above-mentioned side strips 60. The front strip 62 has the same color as the side strips 60. The front strip 62 is removably adhered to the front door 59 with a double-sided adhesive tape (not shown). The front strip 62 extends in the widthwise direction of the base 6.

Figure 15:
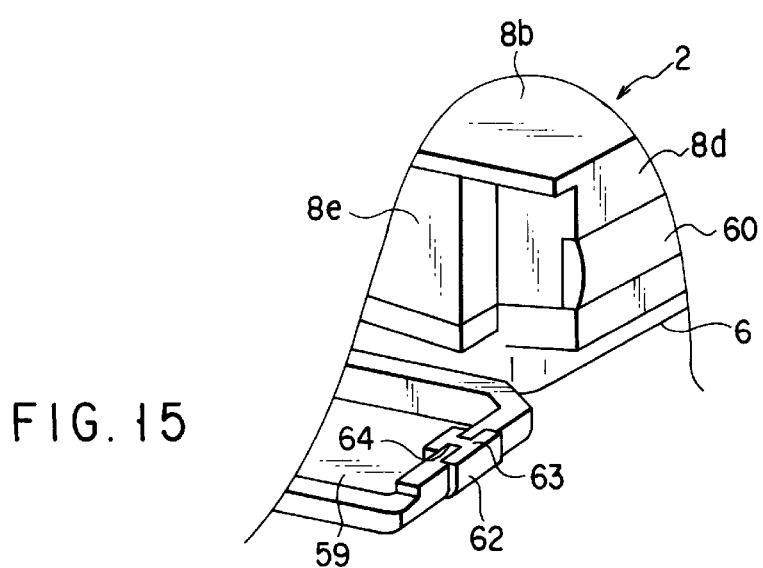
FIG. 15 is a perspective view of the base, depicting the front strip having its end hitched on the front door.

As shown in FIG. 13, the ends of the front strip 62 are continuous to the front ends of the side strips 60 as long as the front door 59 remains closed. The end parts of the front strip 62 are bent in the form of an arc, turning to the left and right of the front door 59. As is best shown in FIG. 15, two engagement members 63 are formed integral with the ends of the front strip 62, respectively. The members 63 are fitted in the grooves 64 cut in the ends of the front door 59. Thus, the engagement members 63 prevent the end parts of the front strip 62 from warping off.

Alternative side strips of various colors are prepared, and so are alternative front strips of various colors. The user of the computer 1 can replace the side strips 60 with any alternatives of the color he or she likes. He or she can also replace the front strip 62 with any alternative of the color he or she prefers. The strips 60 and 62 can be replaced with others easily, without decomposing the housing 5. This is because the strips 60 and 62 are merely bonded to the sides of the base 6 and the front door 59.

Figure 16:
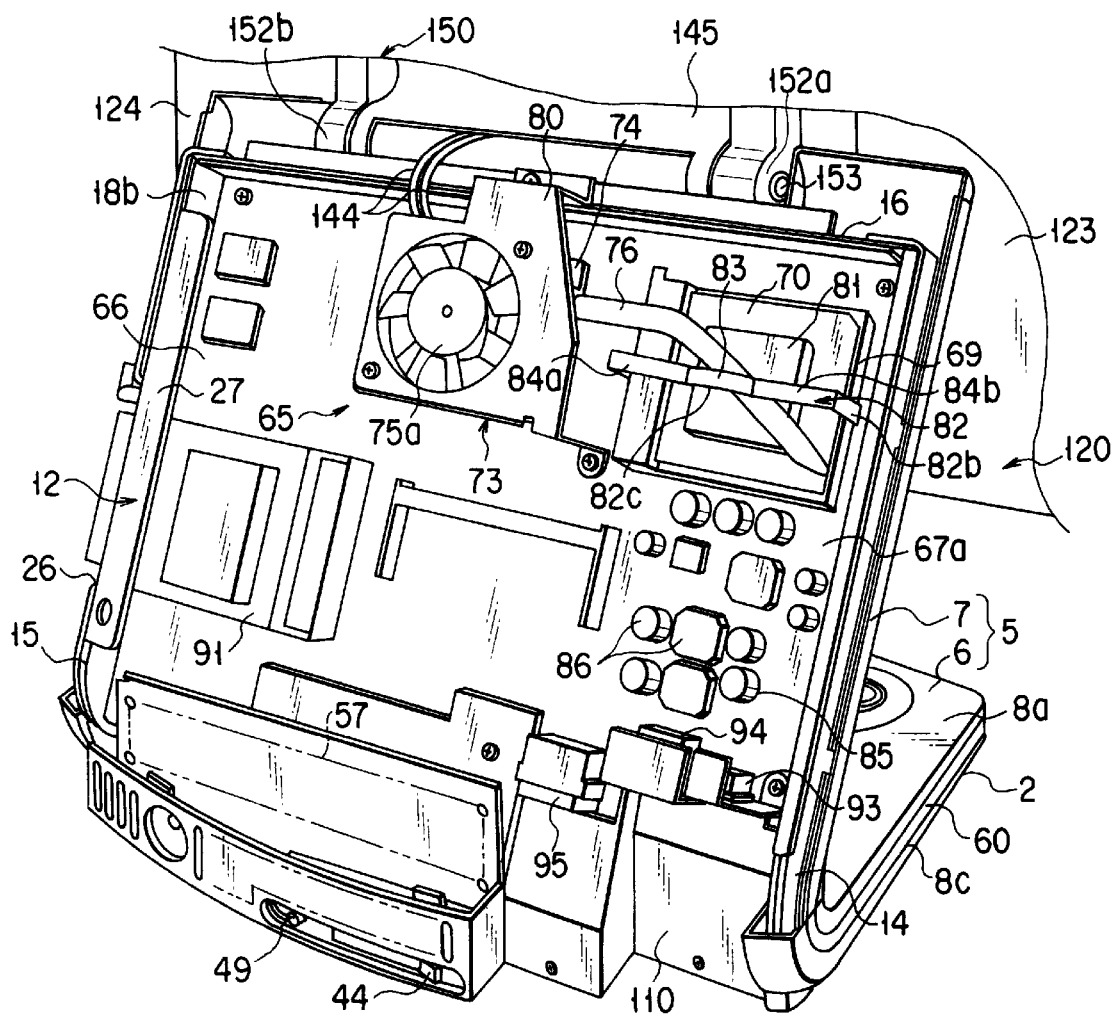
FIG. 16 is a perspective view of the main body, disclosing the internal structure of the stand.

As shown in FIGS. 4, 16 and 17, the stand 7 of the housing 5 contains a circuit module 65. The circuit module 65 has a circuit board 66. The circuit board 66 is fastened by screws to the stand-frame section 13b of the frame 12. Therefore, the circuit board 66 lies between the front wall 10a and rear wall 10b of the stand 7 and stands upright along these walls 10a and 10b.

The circuit board 66 has such a size that it is tightly fitted in the space defined by the reinforcing plates 14 and 15 and display-supporting plate 16 of the frame 12. The circuit board 66 has two mounting surfaces 67a and 67b. The first mounting surface 67a faces the rear wall 10b of the stand 7. The second mounting surface 67b faces the stand-frame section 13b of the frame 13. The board 66 is electrically connected to the input/output board 28 by a flexible printed circuit board (not shown).

A CPU socket 69 is provided on the first mounting surface 67a of the circuit board 66. The CPU socket 69 lies on the upper-right corner of the board 66, as seen from the back of the housing 5. The socket 69 holds a semiconductor package 70, which generates heat while operating. The semiconductor package 70 has an IC chip 71. The IC chip 71 consumes much power to process multimedia information, such as characters, speech, sound, and images. Consuming much power, the IC chip 71 generates so much heat that it needs to be cooled to operate efficiently.

As shown in FIG. 16, a cooling unit 73 is provided in the stand 7 of the housing 5. The unit 73 is designed to cool the IC chip 71. It is mounted on the first mounting surface 67a of the circuit board 66. The cooling unit 73 comprises a heat sink 74, an electric fan unit 75, and a heat pipe 76.

The heat sink 74 is made of metal excelling in thermal conductivity, such as aluminum alloy. The heat sink 74 has a heat-radiating plate 79, which is laid upon the first mounting surface 67 of the circuit board 66. The plate 79 has a number of heat-radiating fins 78 that extend toward the rear wall 10b of the stand 10b.

The fan unit 75 is laid on the tips of the heat-radiating fins 78. The unit 75 has a fan 75a, which is driven by an electric motor (not shown). The fan 75a opposes the heat-radiating fins 78 of the heat sink 74. The heat sink 74 and the fan unit 75 are secured by a bracket 80, not only to the circuit board 66 but also to the display-supporting plate 16 of the frame 12. Hence, the heat-radiating plate 79 of the heat sink 74 is located on the left side of the semiconductor package 70.

Both the heat sink 74 and the fan unit 75 lie in that part of the stand 7 which middle in the width direction of the stand 7. The middle part of the stand 7, which is more thicker than any other parts, has a space large enough to accommodate the heat sink 74 and the fan unit 75. The fan unit 75 is covered with the rear wall 10b of the stand 7. The rear wall 10b has a plurality of exhaust holes 90 in the part that faces the fan unit 75. Through the exhaust holes 90, the air applied by the fan 75a is exhausted outside from the stand 7.

The heat pipe 76 extends over the IC chip 71 and the heat sink 74. The heat pipe 76 has a heat-receiving section and a heat-radiating section. The heat-receiving section is thermally connected to a heat-receiving block 81 and receives the heat generated by the IC chip 71. The heat-radiating section is thermally connected to the heat-radiating plate 79 of the heat sink 74 and radiates the heat to the heat sink 74.

The heat-receiving block 81 is made of metal having high thermal conductivity, such as aluminum alloy. The block 81 is held in the CPU socket 69 by means of a CPU spring 82. The CUP spring 82 pushes the heat-receiving block 81 onto the IC chip 71.

The CPU spring 82 has a pair of legs 82a and 82b and a band-shaped pushing member 82c. The pushing member 82c bridges the legs 82a and 82b. The legs 82a and 82b removably hitches to the ends of the CPU socket 69. The pushing member 82c extends over the heat-receiving block 81, in the width direction of the stand 7. The junctions of the legs 82a and 82b and the pushing member 82c form two acute-angle corners.

The pushing member 82c of the CPU spring 82 has a flat stationary part 83 and a pair of elastic parts 84a and 84b. The stationary part 83 contacts the heat-receiving block 81 at a large area. The elastic parts 84a and 84b connect the stationary part 83 at the ends to the legs 82a and 82b. Both elastic parts 84a and 84b are bent, warping from the ends of the stationary part 83.

Figure 19A:
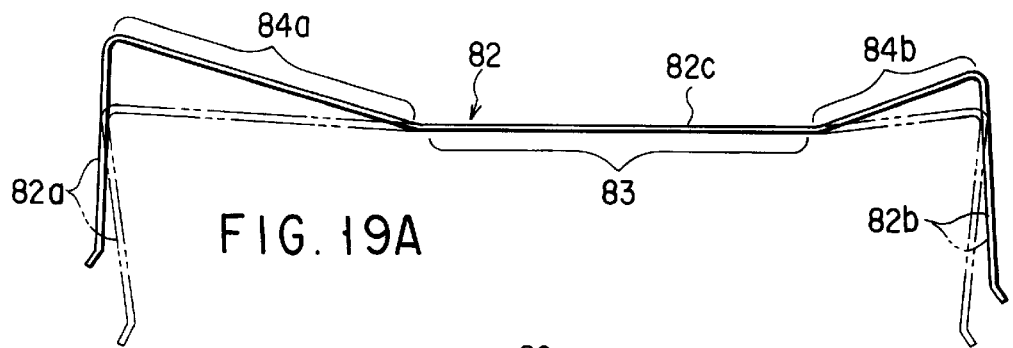
FIG. 19A is a side view of the CPU spring.

When the stationary part 83 is set into contact with the heat-receiving block 81, with the legs 82a and 82b of the CPU spring 82 hitching to the CPU socket 69, the corners of the CPU spring 82 are pulled toward the CPU socket 69 as indicated by two-dot, dashed lines in FIG. 19A. As a result, the elastic parts 84a and 84b elastically deform and the stationary part 83 is pushed to the heat-receiving block 81 with a large force. The heat-receiving block 81 is thereby secured in the CPU socket 69, while pressed onto the IC chip 71.

Figure 19B:
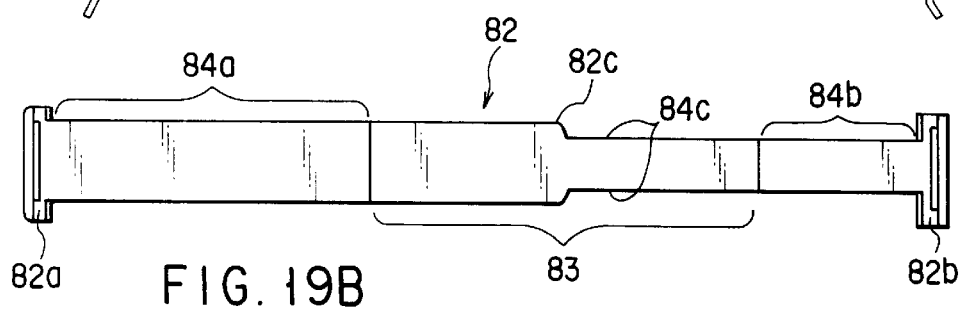
FIG. 19B is a plan view of the CPU spring.

As seen from FIGS. 16 and 17, the heat-receiving block 81 pressed onto the IC chip 71 is set off with respect to the center of the CPU socket 69. Thus, as shown in FIG. 19A and 19B, the stationary part 83 of the pushing member 82c of the CPU spring 82 is displaced in the lengthwise direction of the pushing member 82c. Hence, the elastic parts 84a and 84b have different lengths. The elastic part 84b, which is shorter than the elastic part 84a, exerts a greater reaction than the elastic part 84a. The forces the elastic parts 84a and 84b apply to the ends of the stationary part 83 inevitably differ in magnitude. Consequently, forces of different magnitudes are applied to the different parts of the heat-receiving block 81. This renders it impossible to push the block 81 uniformly onto the IC chip 71.

To push the block 81 uniformly onto the IC chip 71, a notch 84a is made in each lateral edge of the CPU spring 82 as is illustrated in FIG. 19B. The notches 84a extend from the midpoint of the stationary part 83 to the shorter elastic part 84b. Thus, that portion of the spring 82 which extends from the midpoint of the part 83 to the part 84b is narrower than the portion extending from the midpoint of the part 83 to the longer elastic part 84a. The elastic part 84b of the spring 82 can therefore deform readily elastically and generates but a small reaction.

Therefore, when the CPU spring 82 is set into the CPU socket 69, it exerts almost the same reaction to the elastic parts 84a and 84b. The stationary part 83 of the CPU spring 82 can be pressed onto the heat-receiving block 81, with a force uniformly distributed over the entire length of the part 83. As a result, the heat-receiving block 81 exerts a uniform force on the IC chip 71. No excessive force will be applied to a particular part of the IC chip 71.

While operating, the IC chip 71 of the semiconductor package 70 generates operates heat. The heat is conducted to the heat-receiving block 81. The heat is thence transferred to the heat-radiating plate 79 of the heat sink 74 through the heat pipe 76. While being conducted to the heat-radiating plate 79 and then to the heat-radiating fins 78, the heat diffuses and radiates from the stand 7 of the housing 5.

When the temperature of the IC chip 71 rises above a predetermined value, the fan 75a is driven, applying air in the stand 7 into the heat sink 74. The heat sink 74 is thereby cooled. After cooling the heat sink 74, the air is exhausted outside the stand 7 through the exhaust holes 90 made in the rear wall 10b of the stand 7. The heat conduced from the IC chip 71 to the heat sink 74 via the heat pipe 76 is expelled from the stand 7 with high efficiency. The IC chip 71 is thereby maintained at appropriate guaranteed operating temperature.

As shown in FIG. 16, the circuit board 66 has a power-supply circuit section 85. The power-supply circuit section 85 is located below the semiconductor package 70. The circuit section 85 has a number of circuit elements 86 that are mounted on the first and second mounting surfaces 67a and 67b. Among the circuit elements is a power transistor 87 that generates much heat while operating. As shown in FIG. 4, the power transistor 87 is provided on the second mounting surface 67b, opposing the stand-frame section 13b of the frame 12.

Among the circuit elements is a video chip 88, which generates much heat while processing image data. The video chip 88 is arranged on the upper-left corner of the circuit board 66. The video chip 88 and opposes the stand-frame section 13b of the frame 12.

A heat-conducting sheet 89 is interposed between the power transistor 87 and the stand-frame section 13b, thermally connecting the transistor 87 to the stand-frame section 13b. Another heat-conducting sheet 89 is interposed between the video chip 88 and the stand-frame section 13b, thermally connecting the video chip 88 to the stand-frame section 13b. The heat is therefore conducted from the transistor 87 and video chip 88 to the stand-frame section 13b. The heat is thereby diffused in the entire frame 12. Thus, the frame 12 function as a kind of a heat sink for promoting the radiation of heat from the power transistor 87 and the video chip 88.

As FIG. 16 shows, a card holder 91 is provided on the first mounting surface 67a of he circuit board 66. The card holder 91 is designed to hold a PC card (not shown). The card holder 91 communicates via the notches 26 with a card slot 92 that is made in the right side of the stand 7.

Figure 20:
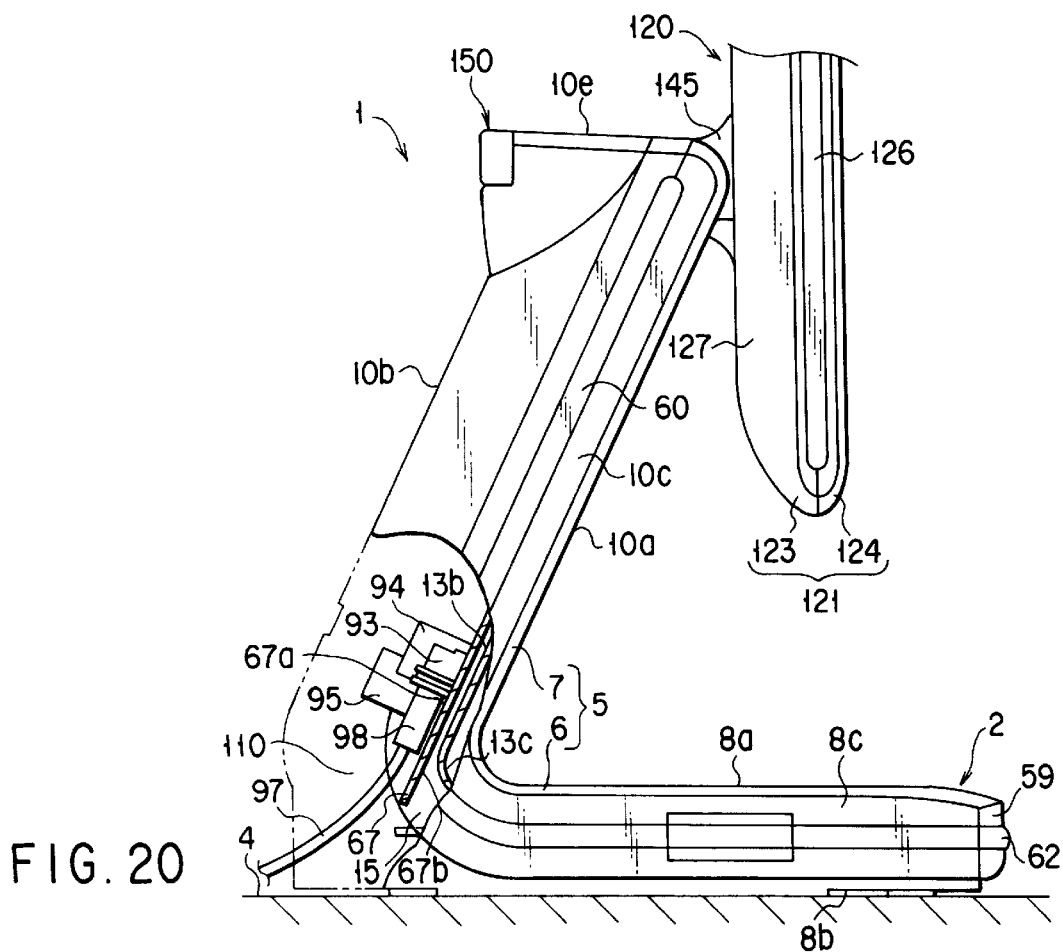
FIG. 20 is a side view of the desktop computer, showing the path along which the power cable is led from the power-supply connector.

As shown in FIGS. 16 and 20, a power-supply connector 93 and a USB connector 94 are provided on the first mounting surface 67a of the circuit board 66. The connectors 93 and 94 are arranged, side by side, on the lower-left corner of the circuit board 66. A modular connector 95 for connecting the computer 1 to a LAN is arranged beside the USB connector 94.

Figure 21:
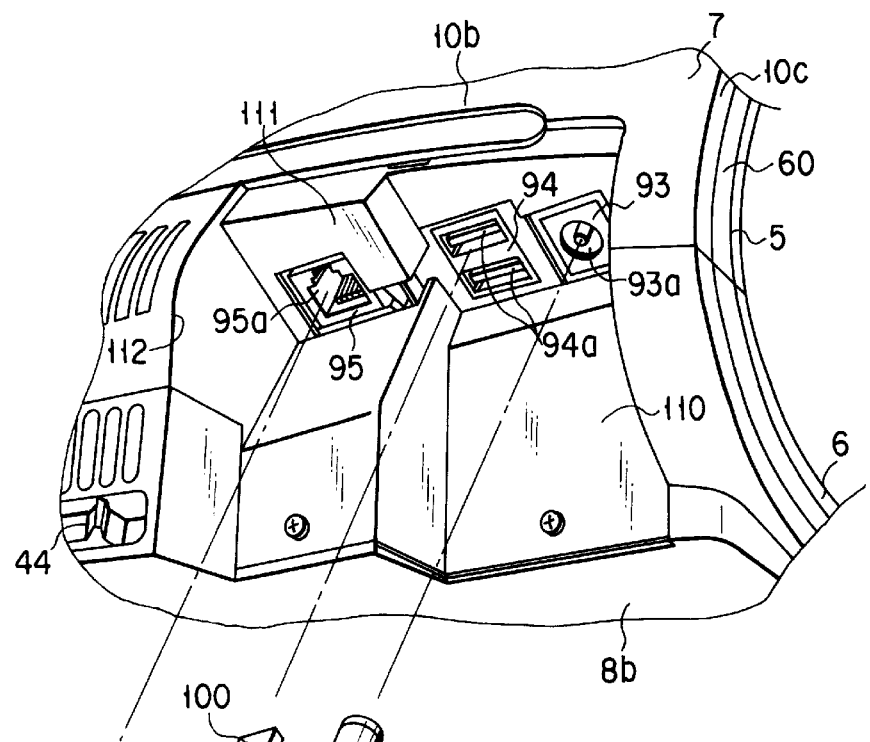
FIG. 21 is a perspective view of the desktop computer, depicting the positional relation of the USB connector, modular connector, power-supply cables connected to these connectors, USB cable and LAN cable.

As is best shown in FIG. 21, the power-supply connector 93 has a socket 93a, which is to receive the cable connector 98 of a power cable 97. The USB connector 94 has a pair of sockets 94a, each of which is to receive the cable connectors 100 of an USB cable 99. The USB cable 99 is led out of the keyboard unit 3. The modular connector 95 has a socket 95a, which is to receive the jack 102 of a LAN cable 101. The sockets 93a to 95a open downwards and are located at a level higher than the base 6.

As shown in FIGS. 4 and 17, the inner surface off the rear wall 10b of the stand 7 is covered with a second shield 105.

The second shield 105 is curved in the form of an arc, extending along the rear wall 10b. A flange 106 is formed with the upper edge of the second shield 105 and projects forwards. The flange 106 has its distal end part lying below the display-supporting plate 16 of the frame 12.

The left and right sides of the second shield 105 respectively contact the second part 14b of the left-side reinforcing plate 14 and the second part 15b of the right-side reinforcing plate 15. The lower edge of the second shield 105 contacts the upper edge of the vertical wall 57 of the first shield 56. The second field 105, the stand-frame section 13b of the frame body 13, the second part 14b of the reinforcing plate 14, and the second part 15b of the reinforcing plate 15 surround the circuit module 65. Thus, they cooperate to prevent leakage of electromagnetic noise from the circuit module 65.

As FIGS. 20 and 21 show, the base 6 has a cable guide 110 at a position that corresponds to a lower-left part of the stand 7. The cable guide 110 has an opening 112 made in the rear wall 10b of the stand 7. The guide 110 is partitioned from the interior of the stand 7 by a partition wall 111. The sockets 93a to 95a of the connectors 93 to 95 are arranged in a row and exposed on the ceiling of the cable guide 110.

The power-supply cable 97, USB cable 99 and LAN cable 101 are guided from below the stand 7 and connected to the connectors 93 to 95, respectively. The cables 97 to 101 are led downwards from the connectors 93 to 95 as long as they are connected thereto.

Figure 22:
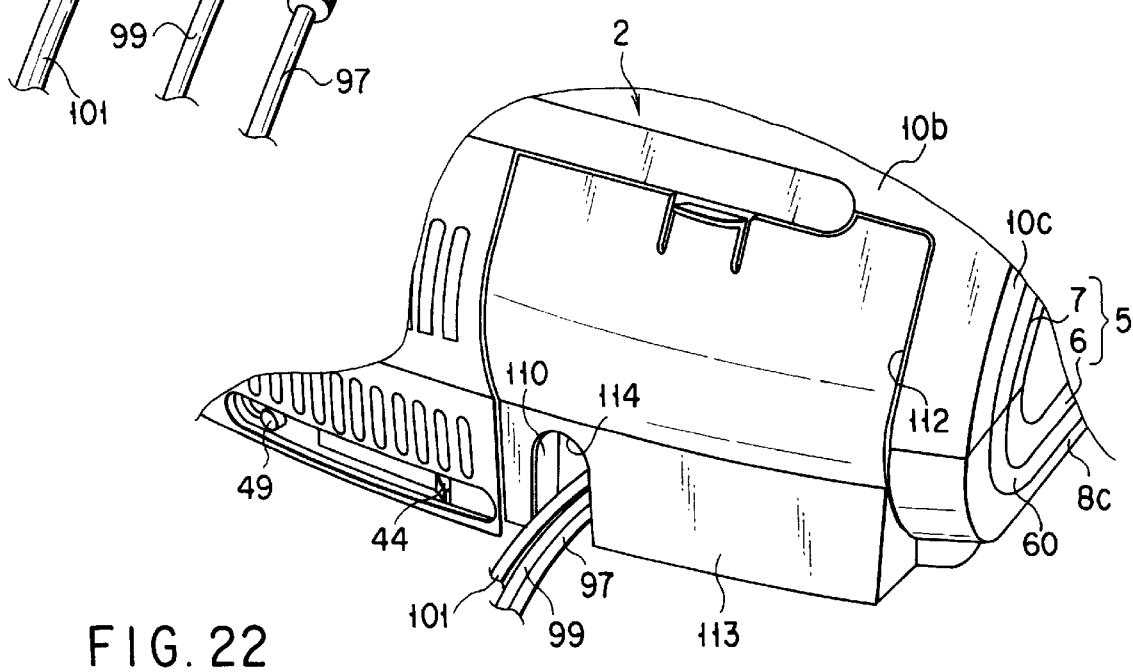
FIG. 22 is a perspective view of the desktop computer, showing the path along which the cables are lead out side through the cable-guiding port made in the cable cover.

As shown in FIG. 22, the opening 112 of the cable guide 110 is covered with a cable cover 113 that can be removed. The cable cover 113 is provided to conceal the junctions between the connectors 93 to 95, on the one hand, and the cables 97, 99 and 101, on the other. The cable cover 113 is curved in the form of an arc, extending along the rear wall 10b of the stand 7.

The cable cover 113 has one cable-guiding port 114. The port 114 is a U-notch cut in the lower edge of the cable cover 113. The cables 97, 99 and 101 connected to the connectors 93 to 95 are guided outside through the cable-guiding port 114.

The connectors 93 to 95 are mounted on the circuit board 66, with their sockets 93a to 95a opening downwards. The cables 97, 99 and 101 respectively connected to the connectors 93 to 95 are therefore led downwards from the upper edge of the cable guide 110. Thus, none of the cables 97, 99 and 110 horizontally extend from the back of the stand 7. Nor does the cable cover 113 horizontally extend from the rear wall 10b of the stand 7 when it conceals the junctions between the connectors 93 to 95, on the one hand, and the cables 97, 99 and 101, on the other. Hence, it suffices to curve the cable cover 113 in the form of an arc, extending along the rear wall 10b. The cover 113 can have a simple shape, making it possible to render the stand 7 as thin as is desired.

The cables 97, 99 and 101 are led from the main body 2 through the cable-guiding port 114. Since the port 114 is narrow, the cables 97, 99 and 101 are bundled together. This help improve the outer appearance of the desktop computer 1, particularly as seen from the back.

As shown in FIGS. 1 and 3, the stand 7 of the housing 5 supports, at its upper end, a liquid-crystal display unit 120. The liquid-crystal display unit 120 comprises a display housing 121 and a liquid crystal panel 122. The housing 121 is made of synthetic resin. The liquid crystal panel 122 is provided in the display housing 121.

The display housing 121 comprises a display cover 123 and a display mask 124. The display cover 123 is a rectangular plate. To the inner surface of the cover 123, the liquid crystal panel 122 is fastened by screws. The display mask 124 is a rectangular frame having a rectangular display opening 125. The screen 122a of the liquid crystal panel 122 is exposed outside through the opening 125 of the display mask 124.

As shown in FIGS. 1 to 3, the display housing 121 has a left side and a right side, which are narrow and extending vertically. A decorative side strip 126 is provided on each side of the display housing 121. The strips 126 are removably adhered to the left and right sides of the housing 121 with double-sided adhesive tape. The side strips 126 are made of rubber so that the user of the computer 1 may feel them without fail. The side strips 126 differ in color from the display housing 121 and extend along the left and right sides of the housing 121.

Figure 24:
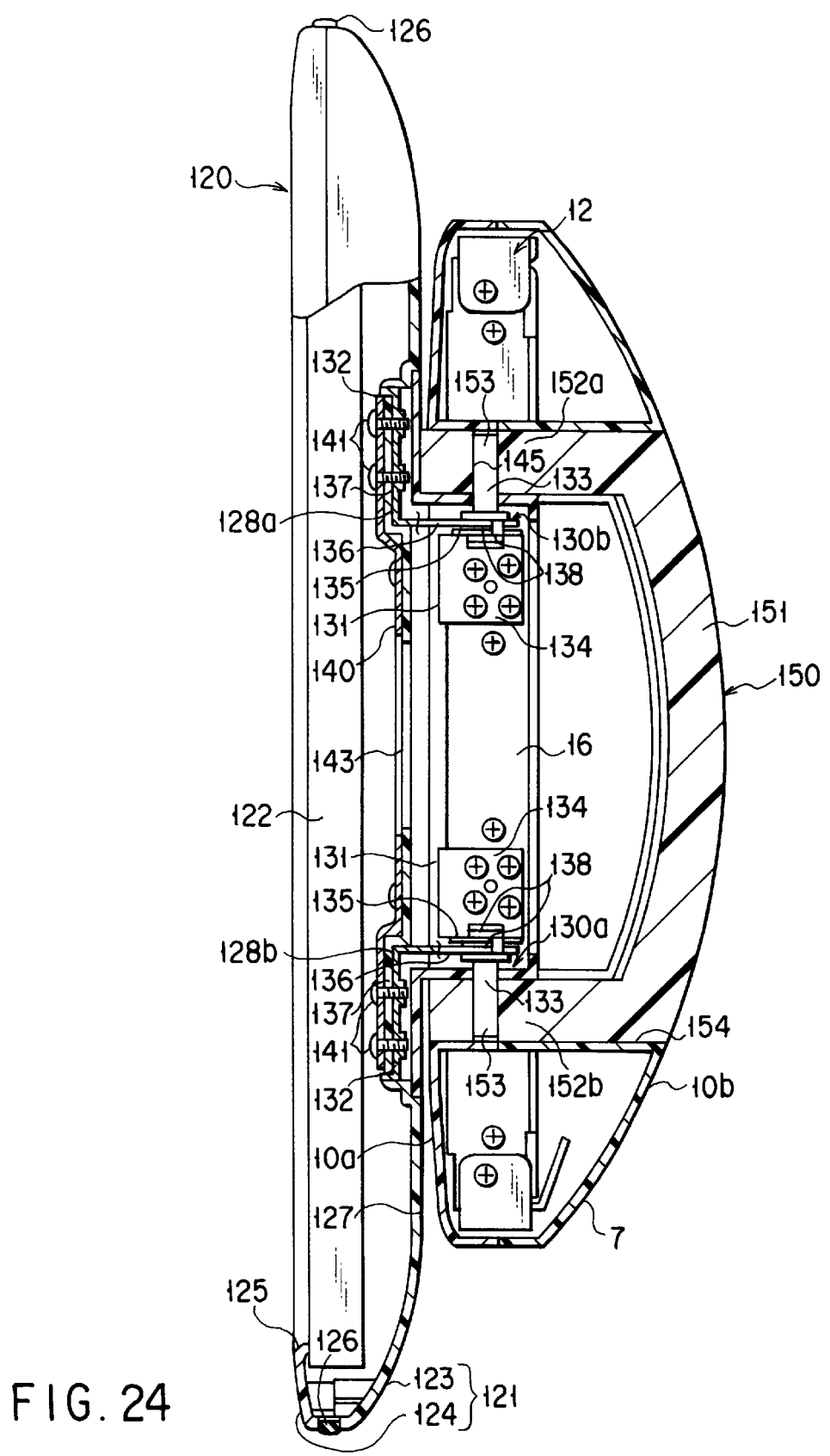
FIG. 24 is a sectional view of the desktop computer, depicting the structure that couples the liquid-crystal display unit with the main body.

As FIGS. 20 and 24 show, the back 127 of the display cover 123 opposes the front wall 10a of the stand 7. In the center part of the back 127, a pair of recesses 128a and 128b are made. The recesses 128a and 128b are spaced apart in the widthwise direction of the display cover 123.

Figure 26:
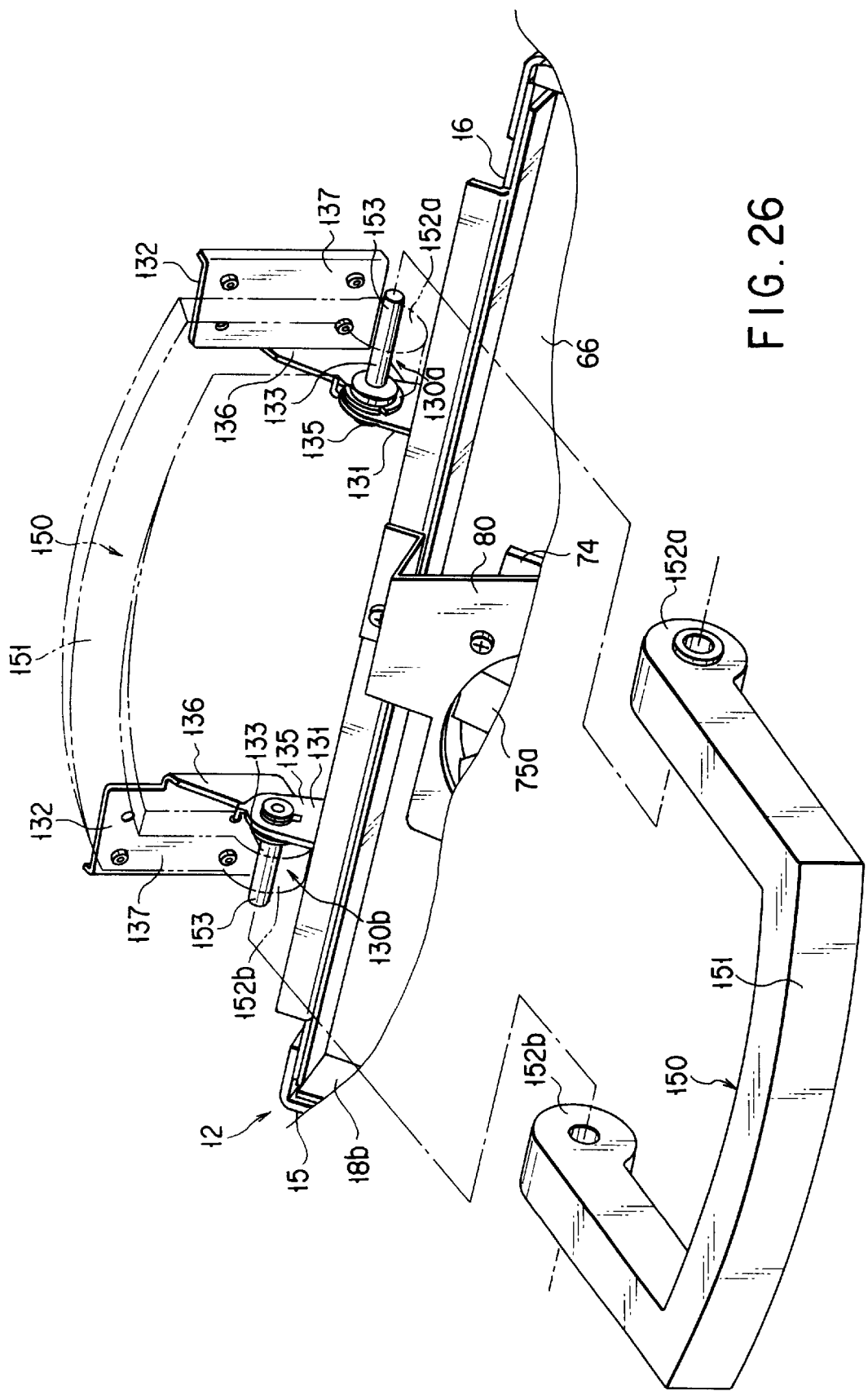
FIG. 26 is a perspective view that illustrates the positional relation between hinges and a handle.

As shown in FIGS. 24 and 26, the liquid-crystal display unit 120 is secured by friction-type hinges 130a and 130b to the display-supporting plate 16 of the frame body 13. The hinges 130a and 130b have two brackets 131 and 132 and a hinge shaft 133 each. The hinge shaft 133 stretches from the first bracket 131 to the second bracket 132.

The first bracket 131 has a base section 134 and a bearing section 135. The base section 134 is fastened by screws to the display-supporting plate 16 of the frame 12. The bearing section 135 extends upwards from the base section 134. The bearing section 135 supports, at its upper end part, the hinge shaft 133, allowing the shaft 133 to rotate around the axis. The hinge shaft 133 of the hinge 130a and the hinge shaft 133 of the hinge 130b horizontally extend, axially aligned with each other.

The second bracket 132 has a shaft-supporting section 136 and a coupling section 137. The shaft-supporting section 136 is secured to the hinge shaft 133 and opposing the bearing section 135 of the first bracket 131. The coupling section 137 is formed integral with the shaft-supporting section 136. A wave washer 138 is interposed between the bearing section 135 and the shaft-supporting section 136, and another wave washer 138 between one end of the hinge shaft 133 and the shaft-supporting section 136. Each wave washer 138 applies friction on the hinge shaft 133, thus controlling the rotation of the hinge shaft 133.

Figure 23:
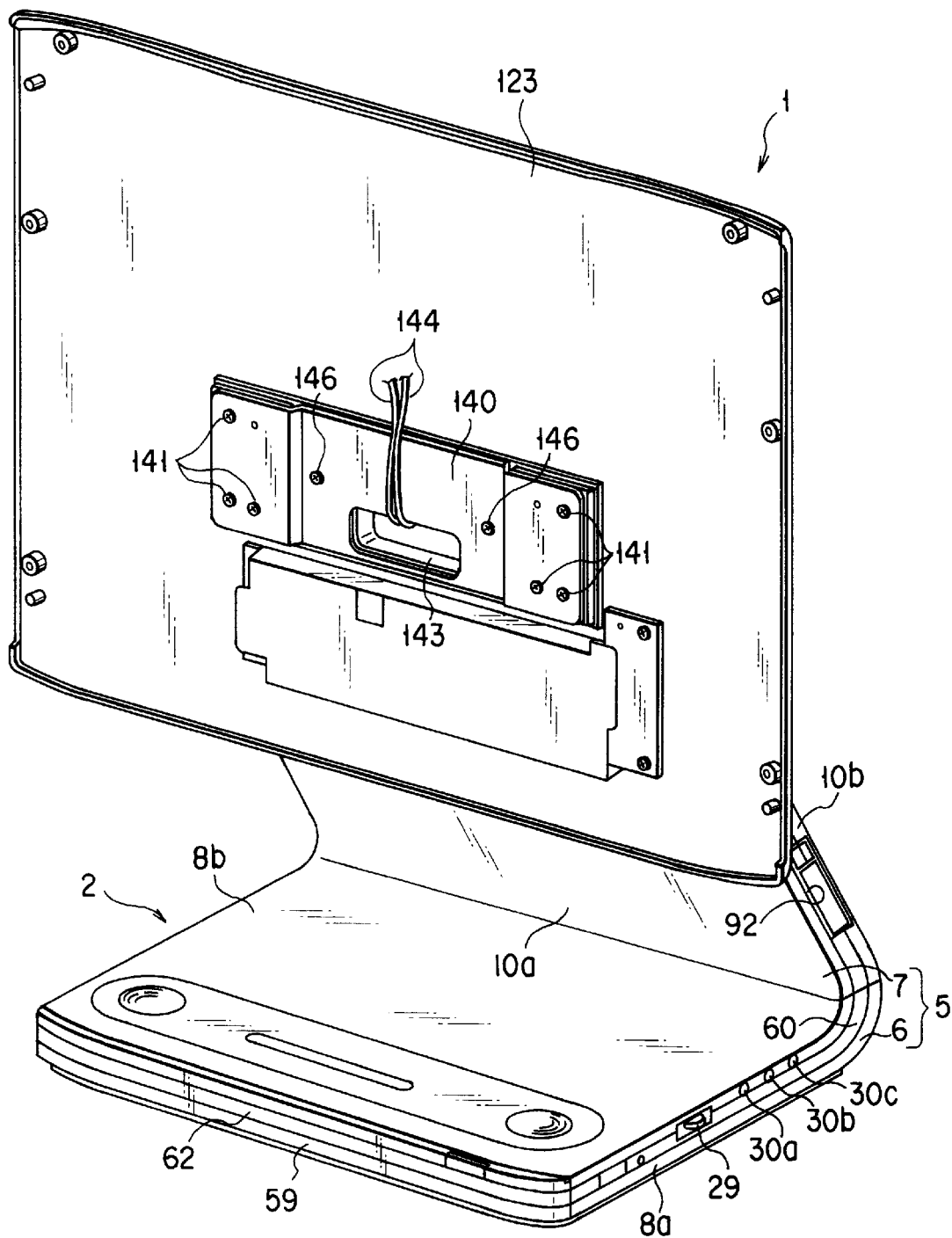
FIG. 23 is a perspective view of the desktop computer, illustrating the positional relation between the display cover and the reinforcing plate.
Figure 25:
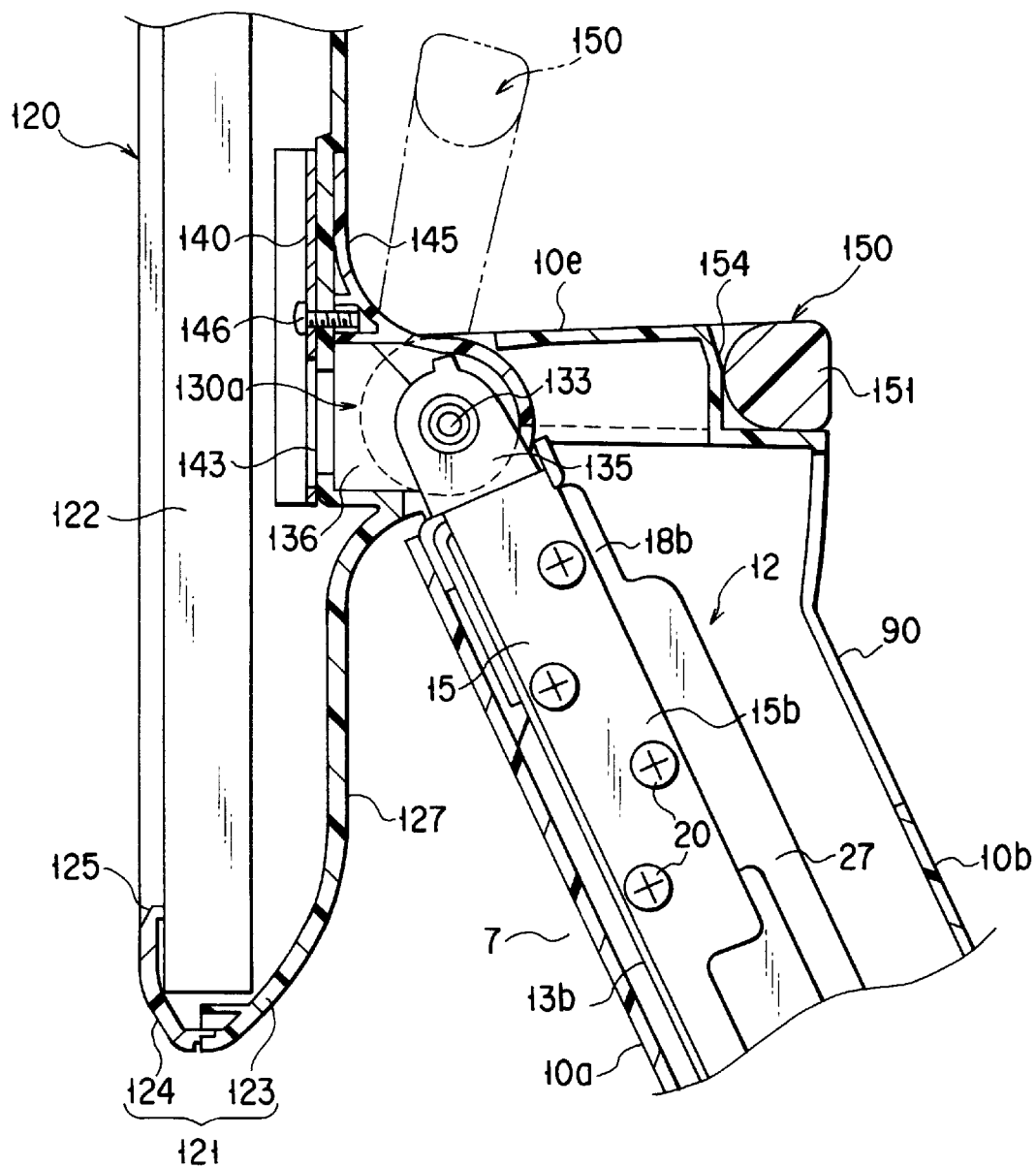
FIG. 25 is a sectional view of the desktop computer, showing the structure that couples the reinforcing plate and the hinge cover together.

The coupling section 137 of the second bracket 132 is fitted in the recesses 128a and 128b made in the back of the display cover 123. AS shown in FIGS. 23 to 25, a reinforcing plate 140 made of metal is laid on the center part of the inner surface of the display cover 123. The reinforcing plate 140 is aligned with the coupling section 137 of the second bracket 137, and the display cover 123 is located between the coupling section. 137 and the reinforcing plate 140. The coupling section 137 and the reinforcing plate 140 are fastened together by screws 141 that pass through the display cover 123. The reinforcing plate 140 therefore holds the second brackets 132 of both hinges 130a and 130b.

Hence, the stand 7 supports the liquid-crystal display unit 120 above the top wall 8b of the base 6, allowing the unit 120 to rotate up and down, around the horizontal hinge shafts 133 through a prescribed angle. The user can change the inclination angle of the unit 120 so that he or she may better see the screen 122a of the liquid-crystal display unit 120.

The second brackets 132 of the hinges 130a and 130b supporting the liquid-crystal display unit 120 are coupled with the reinforcing plate 140 that is laid on the inner surface of the display cover 123. The force the unit 120 generates when it is rotated up or down is therefore exerted on the reinforcing plate 140. Thus, the plate 140 prevents the display cover 123 from bending or deforming. The display unit 120 can therefore be rotated smoothly.

As shown in FIGS. 23 and 24, the display cover 123 and the reinforcing plate 140 have a cable-guiding hole 143. A cable 144 passes through the cable-guiding hole 143. The cable 144 electrically connects the liquid crystal panel 122 to the circuit board 66. The cable-guiding hole 143 is located between the hinges 130a and 130b.

The hinges 130a and 130b, the recesses 128a and 128b of the display cover 123 and the cable-guiding hole 143 are covered with a hinge cover 145. The hinge cover 145 is fastened to the reinforcing plate 140 by two screws 146 that pass through the display cover 143.

As shown in FIGS. 2 and 3, a handle 150 is secured to the top of the stand 7, which the user may hold to carry the desktop computer 1. The handle 150 has a grip section 151 and two boss sections 152a and 152b. The boss sections 152a and 152b are formed integral with the ends of the grip section 151, respectively. As shown in FIGS. 24 and 26, the boss sections 152a and 152b oppose each other, with the first brackets 131 of the hinges 130a and 130b located between them.

The shafts 133 of the hinges 130a and 130b have a handle-supporting section 153 each. The handle-supporting sections 153 pass through the boss sections 152a and 152b of the handle 150, respectively, and can rotate around their axes. Thus, the handle 150 is supported by the main body 2 and can rotate between two positions. In the first position, the handle 150 stand upright from the stand 7 as is illustrated in FIG. 2. In the second position, the handle 150 falls down onto the stand 7 as is shown in FIG. 3. The handle 150 rotates around the same axis as the liquid-crystal display unit 120 does.

While the handle 150 remains in the second position, its grip section 151 is set in a storage groove 154 that is made in the top wall 10e of the stand 7.

As indicated above, the stand 7 projects upwards from the rear end of the base 6 and supports the liquid-crystal display unit 120. The stand 7 is a flat box having a width similar to that of the base 6. The stand 7 can therefore have an inner space that extends in the widthwise direction of the base 6. The inner space is large, accommodating the circuit module 65 that is one of the major components of the desktop computer 1.

The base 6 contains the other major components of the computer 1, such as the input/output board 28, hard disk drive 31 and CD-ROM drive 38, are incorporated in the base 6. Thus all of the major component of the computer 1 can be laid out in three-dimensional fashion, in accordance with the shape of the main body 2. The base 6 placed on the horizontal surface 4 (e.g., the top of a desk) therefore has a smaller surface area and a smaller thickness than in the case where the circuit module 65 is incorporated in the base 6, too.

Hence, the main body 2, which looks L-shaped as viewed from the side, is as compact as is desired. The main body 2 does yet contain the relatively large components, such as the hard disk drive 31, CD-ROM drive 38 and circuit module 65, because these components are densely arranged without wasting space.

Furthermore, the hard disk drive 31 and the CD-ROM drive 38, which should not be vibrated, are provided within the base 6 placed on the horizontal surface 4. The drives 32 and 38 are therefore located below the center of gravity of the main body 2. Hence, they will not be vibrated.

The stand 7 is inclined toward the front of the base 6 as it extends upwards from the rear end of the base 6. The liquid-crystal display unit 120 which is supported at the top of the stand 7 and which is relatively heavy can, therefore, be positioned above that part of the base 6 which is half way between the front and rear ends of the base 6. Thus, the gravity center of the desktop computer 1 can be located above the base 6. The main body 2 can assume a stable position on the horizontal surface 4. The main body 2 need not have legs for preventing its toppling, unlike the main body of the conventional desktop computer.

Moreover, the main body 2 supporting the display unit 120 looks L-shaped as shown in FIG. 2, not shaped as a rectangular box, as it is viewed from the side or slantwise. Obviously, the main body 2 presents better looking than the box-shaped main body of the conventional desktop computer. Not only does the main body needs no toppling-preventing legs, but also does it appear better. The desktop computer 1 can thus well mingle in the living environment.

In addition, the frame 12, i.e., the backbone of the main body 2, is bent in the form of letter L, extending along the sides of the housing 5. The hinges 130a and 130b support the liquid-crystal display unit 120 on the top of the stand-frame section 13b. As indicated above, the stand-frame section 13b projects upwards from the rear edge of the base-frame section 13a of the frame 12.

The user changes the inclination angle of the display unit 120 in order to see the screen 122a better. If so, a load is applied on the top of the stand-frame section 13b to bend the same forwards or backwards. Also, the stand-frame section 13b always receives a load that tends to bend the base-frame section 13a downwards since the liquid-crystal display unit 120 is comparatively heavy.

The coupling section 13c of the frame body 13 needs to withstand these loads. That part of the coupling section 13c on which the loads are applied is reinforced by none of the bracket sections 17a to 18b. Inevitably, the coupling section 13c may not be not strong enough to withstand the above-mentioned loads.

Nevertheless, the frame 12 has reinforcing plates 14 and 15 secured to the ends of the frame body 13. The reinforcing plates 14 and 15 span the base-frame section 13a and stand-frame section 13b of the frame body 13. Further, the plates 14 and 15 have a cross section that extends at right angles to the base-frame section 13a and stand-frame section 13b. Thus, when a load is imposed on the stand-frame section 13b to bend the plates 14 and 15 forwards or backwards, or toward the base-frame section 13a, a stress will develop in the third part 14c of the plate 14 and the third part 15c of the plate 15. This stress may be high, comparable to the sum of the above-mentioned loads. Moreover, both reinforcing plates 14 and 15 are firm and strong against any external load, because they are made of stainless steel which is material harder and stronger than steel.

As a result, the coupling section 13c of the frame body 13 is reinforced by the plates 14 and 15 that lie at the ends of the section 13c. The frame 12 can therefore attain sufficient strength as a whole, without elaborating the structure of the frame body 13. Hence, the stand-frame section 13b can alone firmly support the liquid-crystal display unit 120.

It should be noted that the inclination angle of the stand 7 of the main body 2 is not limited to the value specified above. Rather, it may be of any value less than 90°.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data-processing apparatus comprising:
   a main body including a base and a stand extending upwards from a rear end of the base, said stand inclining toward a front of the base as the stand extends upwards;
   functional components provided in the base;
   a circuit module provided in the stand and having a circuit board and a plurality of circuit components mounted on the circuit board; and
   a flat liquid-crystal display unit rotatably supported at a top of the stand, the flat liquid-display unit having a coupling section for coupling said flat liquid-crystal display unit and the top of the stand, the coupling section being displaced downwards from an upper end of the flat liquid-display unit so that the flat liquid-crystal display unit overhanging upwards from the top of the stand.

2. A data-processing apparatus according to claim 1, wherein the base of the main body has a receptacle and the functional components are removably held in the receptacle.

3. A data-processing apparatus according to claim 1, wherein the stand of the main body has a front wall extending upwards from a rear end of the base and a rear wall opposing the front wall, and the circuit board of the circuit module standing upright between and along the front wall and the rear wall.

4. A data-processing apparatus according to claim 1, wherein the liquid-crystal display unit is supported at the top of the stand by hinges and able to rotate around a horizontal axis.

5. A data-processing apparatus comprising:
   a main body including a base and a stand extending upwards from the base, said main body has a cable guide at a lower end of the stand;
   functional components provided in the base;
   a circuit module provided in the stand and having a circuit board and a plurality of circuit components mounted on the circuit board, said circuit board having a plurality of connectors provided at a lower edge and exposed to the cable guide, each of the connectors having a socket to which a cable led from the lower end of the stand is removably connected; and
   a flat liquid-crystal display unit rotatably supported at a top of the stand.

6. A data-processing apparatus according to claim 5, wherein the cable guide of the main body is covered with a removable cable cover, and the cable cover has one cable-guiding port.

* * * * *

UNITED STATES PATENT AND TRADEMARK OFFICE
CERTIFICATE OF CORRECTION

PATENT NO.     : 6,392,873 B1  Page 1 of 1
DATED          : May 21, 2002
INVENTOR(S)    : Honda It is certified that error appears in the above-identified patent and that said Letters Patent is hereby corrected as shown below:

Column 17,
Line 26, change "overhanging" to -- overhangs --.

Signed and Sealed this

Fifteenth Day of April, 2003

JAMES E. ROGAN
*Director of the United States Patent and Trademark Office*